(12) United States Patent
Prokoski

(10) Patent No.: US 7,027,621 B1
(45) Date of Patent: Apr. 11, 2006

(54) METHOD AND APPARATUS FOR OPERATOR CONDITION MONITORING AND ASSESSMENT

(75) Inventor: Francine J. Prokoski, Fairfax, VA (US)

(73) Assignee: Mikos, Ltd., Fairfax Station, VA (US)

(*) Notice: Subject to any disclaimer, the term of this patent is extended or adjusted under 35 U.S.C. 154(b) by 484 days.

(21) Appl. No.: 10/097,623

(22) Filed: Mar. 15, 2002

Related U.S. Application Data

(60) Provisional application No. 60/275,836, filed on Mar. 15, 2001.

(51) Int. Cl.
  *G06K 9/00* (2006.01)
(52) U.S. Cl. .................. 382/118; 382/115; 382/117; 382/190; 340/575; 340/576; 180/272
(58) Field of Classification Search ............. 382/115, 382/117, 118, 104, 190; 340/575, 576, 573.1, 340/937; 348/77, 78; 351/209–211; 180/272; 600/301, 310, 473–475
See application file for complete search history.

(56) References Cited

U.S. PATENT DOCUMENTS

| | | | | |
|---|---|---|---|---|
| 4,975,969 A | * | 12/1990 | Tal | 382/116 |
| 5,163,094 A | * | 11/1992 | Prokoski et al. | 382/118 |
| 5,570,698 A | * | 11/1996 | Liang et al. | 600/558 |
| 5,689,241 A | * | 11/1997 | Clarke et al. | 340/575 |
| 5,729,619 A | * | 3/1998 | Puma | 382/115 |
| 5,878,156 A | * | 3/1999 | Okumura | 382/118 |
| 6,097,295 A | * | 8/2000 | Griesinger et al. | 340/576 |
| 6,173,068 B1 | * | 1/2001 | Prokoski | 382/115 |
| 6,571,002 B1 | * | 5/2003 | Ogawa | 382/117 |
| 6,633,655 B1 | * | 10/2003 | Hong et al. | 382/118 |

* cited by examiner

*Primary Examiner*—Bhavesh M. Mehta
*Assistant Examiner*—John Strege
(74) *Attorney, Agent, or Firm*—Whitham, Curtis & Christofferson, PC

(57) ABSTRACT

A system using passive infrared imaging of the face and other body parts of an operator to obtain observables by automatically extracting features from a sequence of images, analyzing the extracted features, and then assessing the results for indicators of performance of a task by the operator in order to provide early warning of potential cognitive or motor impairment and thereby facilitate risk reduction and quality maintenance. The infrared condition monitoring system (IR-CMS) serves to a) assess cognitive and/or physical readiness to perform a particular task; b) provide condition assessment feedback to the subject and his appropriate supervisors; c) activate measures to increase short-term alertness and other readiness factors; d) limit potential risks by restricting the subject's access, responsibility, or authority; and e) facilitate rapid medical treatment, evacuation, quarantine, re-training, or counseling as appropriate. The same condition monitoring and assessment system can also be used during training and simulator exercises to evaluate personnel for assignment.

22 Claims, 12 Drawing Sheets

Transition from Alert to Asleep

IRID Determines:
- Range and frequency of head movement
- Eye fixation points
- Eye movements
- Blink rate
- Sweating
- Expression changes
- Speech-related movements
- Nodding head
- Facial cooling
- Respiration rate Activity Monitoring
IRID Determines:
- Head movement range and frequency
- Use of phone
- Eating and drinking
- Sneezing, coughing
- Attending to instruments
- Periods of time watching roadway
- Smoking Partial Faces are Sufficient for Analysis - and Considered Less Intrusive

METHOD AND APPARATUS FOR OPERATOR CONDITION MONITORING AND ASSESSMENT

This application claims the benefit of Provisional Application No. 60/275,836, filed Mar. 15, 2001.

BACKGROUND OF THE INVENTION

1. Field of the Invention

The present invention generally relates to systems for monitoring and assessing human performance, and more particularly to use of biometric technology for determining the condition of an operator performing a critical task.

2. Background Description

Persons performing critical tasks may become incapacitated due to fatigue, inattention, stress, anxiety, alcohol, drugs, environmental or medical conditions. Resulting human errors or oversights may cause significant security and safety risks, or may decrease the quality of the work performed. It is therefore essential that the condition of critical personnel be monitored to provide evaluation of the quality of human performance and early warning of reduced effectiveness which might lead to human error. The International Standards Organization has established standards and certification procedures under which facilities, processes, and products are deemed to meet various quality levels. Condition monitoring and assessment of human operators can provide a similar technique for quality evaluation of the human labor component in certified processes.

Biometric identification techniques have been developed to insure that only the correct authorized person can obtain access to physical areas, computer networks, private information, valuable goods and services. However, most biometrics do not ensure that the subject is alive and able to perform the intended activity. Through biometric identity theft, an unauthorized person can use the fingerprint, iris pattern, voice print, or handwritten signature of an authorized person to gain access. The authorized person may no longer be alive when his biometric data is used, or he may be forced to cooperate against his will.

Drowsy, inattentive, and enraged drivers are major causes of accidents. Especially when those accidents involve trucks, they are often fatal and involve multiple vehicles. Similar problems occur for drivers of automobiles, trains, buses, and planes; with the primary causes being: sleepiness, stress, distractions due to cell phone use, distractions associated with tuning radios, eating, adjusting seat belts, talking or attending to passengers, medical emergencies such as stroke, seizure, or heart attacks, effects of medication such as cold and flu over the counter items. Among young drivers the problems are even more prevalent. Most teens admit they speed when driving. A majority don't wear seat belts. Nearly half teen drivers admit to sometimes being intoxicated or drug impaired. The drunk driver and the drowsy driver have been found to display the same type of inattentive behavior—with the same results.

A body of statistical evidence exists linking accidents to fatigue and inattention, but no such evidence has been compiled linking accidents to "road rage". The general consensus is that such incidents are on the increase. While there has been no study on observables which would indicate an enraged driver, the assumption is made here that physiological measures such as blood pressure and temperature changes, agitated movements of the head, eyes, and hands, and erratic maneuvers of the vehicle would be correlated with rage. Those same observables could indicate other medical events as well.

Fatigue, inattention, stress, and rage are significant factors in the performance of other tasks besides driving. Computer operators, security watchmen, medical operations center personnel, utility and transportation control center staff, air traffic controllers, border patrols, soldiers, casino surveillance staff, surgeons, and others doing lengthly, high stress, or repetitive and boring tasks are prone to condition-related errors which can have significant security, safety, or economic results.

Drowziness, inattention, anxiety and stress are the cause of more than 50% of accidents and errors in the workplace. Alcohol and drugs, including over-the-counter, prescription, and illicit substances, are involved in more than 15% of detected incidents. Medical emergencies such as stroke, seizure, or heart attacks, are also serious concerns in persons performing critical or life-threatening tasks.

The problems are most acute in jobs involving shift work, high stress, physically demanding, or repetitive and boring tasks. Those characteristics describe many of the most critical jobs associated with security and safety: air and ground traffic controllers, border patrols, pilots and commercial vehicle drivers, and emergency response workers who alternate between periods of inactivity and periods of hyperactivity. Fatigue, stress, and the other conditions listed account for lowered physical and cognitive readiness to perform by persons who are in motion, such as patrol officers, firefighters, Hazmat response forces, soldiers, trauma response teams, surgeons, and SWAT teams. This range of conditions also accounts for lowered proficiency and productiveness, and increased errors in many types of tasks performed by seated persons attending to one or more displays such as at: security operations centers, power plant operation centers, 911 response centers, call centers, help desks, medical ICU desks, computer network activity monitoring desks, stock brokers, loan officers, etc. There are also important military uses. The Office of the Secretary of Defense has initiated a program on "Cognitive Readiness" which aims to assess the level of competence of soldiers in combat or personnel performing critical tasks. The IR-CMS system can be configured for fixed, mobile, or wearable use to accommodate all subjects.

Anticipating, detecting, responding to, and protecting against human accidents and errors requires the development of systems for realtime condition monitoring and assessment of essential personnel or any person whose condition or actions may place themselves or others at risk.

Physiological monitors used to provide realtime indications of fatigue, stress, anxiety, and medical condition generally require placement of electrodes or other sensors on the skin to produce Electroencephalograms (EEG), Electrooculograms (EOG), Electromyograms (EMG), Electrocardiographs (ECG), and measures of Respiratory effort, Respiratory airflow, and Oxygen saturation of arterial blood. In certain potential condition monitoring applications, such as for surgical patients, the subject is already strapped into a fixed position and contact sensors may be readily used. However, contact sensor approaches are impractical for continuous monitoring of most individuals at work.

The most extensive studies of condition monitoring for non-medical patients have involved fatigue detection in drivers. Three approaches to collecting and analyzing sensor data have each received significant attention and are the subject of numerous patents.

(1) Analysis of Facial Video to determine the percentage of eyelid closure over a period of time (PERCLOS), head nod, facial expression, and evidence of muscle tone.

(2) Physiological Sensor data such as EEG, ECG, temperature, respiration, oxygen level, and indications of sleep apnea.

(3) Driver Performance Indicators based upon vehicle movements such as lane changes, brake and jerk, speed changes, and failure to signal.

The PERCLOS system for analysis of eyelid closure percentage is considered the most reliable non-contact indicator of fatigue. That technique has several limitations, including its reliance on carefully positioned illuminators to produce reflections from the eyes to locate the eye positions relative to the camera. These limitations are especially troubling when ambient lighting conditions vary, making it difficult to detect eyelid status.

Various other methods have been proposed which use visual cameras to watch the driver's face and determine blink rate and gaze angle. Most use IR illuminators during darkness conditions. If glasses are worn by the driver, there is often a problem seeing the eyes due to glare from the illuminator, headlights, or ambient lights. In that case, blink rates and eyelid closure cannot be seen, nor can gaze angle. An estimate of gaze angle may be made from the nose position. Other condition monitoring approaches applicable to persons performing critical tasks are summarized below.

Analysis of rapidly changing human conditions is required in monitoring for loss of consciousness in high performance aircraft crew. In that application, sensors are required to actuate an alarm system or automatic pilot system to assume control of the aircraft. The automated decision making system must take into account individual crew member's physiological responses and conditioning. Previously, such monitoring involved anatomically invasive instrumentation devices or use of dermal sensing electrodes. Such devices are considered to be physiologically and psychologically discomforting to aircrew members.

Tripp (H1,039i, 1992) uses non-invasive sensing of arterial blood supply in the portions of the pilot's body adjacent to the cranium through the use of pulsating vascular bed optical signal transmission to perform intrusion-free physiological condition monitoring of pilots. Use of the physiological monitoring signals to generate alarm or assume control of the aircraft is also disclosed along with representative data associated with the sensed pilot physiological well-being indicators. While considered by Tripp to be non-invasive, his technique requires customized headgear or facegear which incorporates contact sensors. His only monitored condition is the cranial blood flow, which he asserts to be a generalized indicator of well-being.

U.S. Pat. No. 6,313,749 to Horne et al. uses driver or operator interrogation and response, combined with various objective sensory inputs on vehicle condition and driver control action, and translates these inputs into weighing factors to adjust a biological activity circadian rhythm reference model, in order to provide an audio-visual sleepiness warning indication. This approach does not provide the automated assessment of multiple indicators provided by the IR-CMS approach.

U.S. Pat. No. 6,107,922 to Bryuzgin uses a self-contained head set based sleep or fatigue alarm for a driver of a vehicle. It contains a set of arms extending from the alarm housing around the driver's head to the area under the driver's lower jaw. Involuntary relaxation of the driver's lower jaw causes rotation of the arms which in turn urges the movable contact against the stationary contact and therefore leads to the completion of the electrical circuit. After a predetermined delay, a buzzer or vibrator is activated to awaken the driver. This approach is considered highly invasive, and does not provide condition monitoring assessments.

U.S. Pat. No. 4,602,247 to Seko automatically determines driver rest periods and estimates when the driver might be fatigued. He does not perform direct condition monitoring of the driver and does not take personal variations or scenarios into account.

U.S. Pat. No. 4,502,122 to Yanagishima similarly estimates fatigue based upon driving time and driving conditions and then sounds an alarm.

U.S. Pat. No. 5,900,819 to Kyrtsos determines axle acceleration which exceeds a threshold, and from that estimates that the driver has jerked the wheel because he is fighting to stay awake. This approach has limited utility because it works only in the case where the driver displays such behavior. It does not detect early stages of fatigue, does not detect other conditions, and has no application to non-driver condition monitoring.

U.S. Pat. No. 5,786,765 to Kumakura determines the driver's normal blink rate at the start of a driving period and then monitors changes in the number of blinks per period. The driver is assessed as being drowsy if the number of slow blinks exceeds a threshold number. This is a version of the PERCLOS technique which uses visual face imagery only.

U.S. Pat. No. 5,689,241 to Clarke, Sr. et al. uses two infrared imagers to look for two indicators of driver drowsiness: one determines whether the eyes are open or shut, the second looks for temperature changes of the exhaled gas plume from normal breathing patterns. Clarke asserts that the gas plumes will lower in volume as the driver begins to hypoventilate, thus increasing the driver's blood level of carbon dioxide. Clarke states this is in most part the reason for early drowsiness associated with sleep. The combination of shut eyes and a decrease in breath temperature, which is a physiological response to hypoventilation thus initiating drowsiness, will trigger the infrared camera to zoom onto the eye region of the driver to watch for the eyes to open. This combined data is routed to the sleep status microprocessor memory via an optical image detector and thermal sensor for data changes above or below baseline data measurements. While Clarke uses IR sensors to monitor the face of a driver, he looks only at the temperature of the driver's exhaled breath and not at the face temperature. This approach would be affected by temperature variations due to air conditioning or heat from the vehicle, open windows, other passengers, and ambient changes in temperature. Since the temperature changes used to determine drowsiness are small, they can easily be overwhelmed by variations due to these other causes. Thus, the primary indicator of drowsiness is the detection of closed eyes, which is not an early indicator of impending fatigue. Clarke's approach does not provide a sufficiently wide range of condition monitoring indicators to be reliable.

U.S. Pat. No. 5,585,785 to Gwin et al. monitors the driver's hand grip pressure on the steering wheel, and sounds an alarm when the pressure falls below a lower limit. His technique does not use any imaging sensor, and provides no condition monitoring assessment.

U.S. Pat. No. 5,507,291 to Stirbl et al. describes a method and an associated apparatus for remotely determining information as to a person's emotional state. Stirbl uses active radiation beamed at an individual to elicit and measure reflective energy. He analyzes the differences in reflective energy and correlates that with emotional and medical states.

In particular, he discusses polygraph applications. Stirbl is limited to the use of calibrated and known active radiation, aimed at particular locations on the body, and at particular angles of incidence.

U.S. Pat. No. 4,555,697 to Thackrey uses a teeth-held tilt alarm to signal that the driver has become drowsy. This approach is considered highly invasive and with few acceptable applications.

Therefore there is a need for a more reliable and robust condition monitoring system which is non-invasive and usable in a wide variety of situations where a human operator is performing critical tasks.

SUMMARY OF THE INVENTION

It is therefore an object of the present invention to provide a generally usable non-invasive condition monitoring system.

A further object of the invention is to provide a condition monitoring system which is reliable notwithstanding changes in lighting conditions.

Another object of the invention is to provide robustness by automated assessment of multiple indicators.

It is also an object of the invention to provide reliability by using a sufficiently wide range of condition monitoring indicators.

Yet another object of the invention is to provide operator identification that is relatively immune from biometric identity theft.

It is an object of this invention to provide a method and apparatus for the realtime monitoring of vehicle operators to determine conditions which may interfere with their ability to successfully and safely control the vehicle, and to mitigate potential damage.

It is an object of the invention to provide performance quality monitoring of persons whose tasks require them to make rapid decisions based upon computer-generated displays.

It is an object of the invention to provide a method and apparatus for monitoring the health and safety of emergency response and military personnel.

It is an object of the invention to provide a means for rapidly screening persons being interviewed to detect possible deception.

In contrast to use of specific physiological monitors, the present invention is an infrared condition monitoring systems (IR-CMS) which uses generalized non-contact passive infrared image analysis. This approach offers significant flexibility, a broad range of measurable condition parameters, and operational convenience. The use of subsurface anatomical reference points observable in the infrared images provides repeatable analysis locations and facilitates the analysis of even very small movements associated with muscle tone. The analysis of very sensitive thermal variations provides early indication of trends in the subject's condition. The segmentation of the thermal image into small cells allows for precise localization of the analysis. The availability of rapid sampling rates means that even transitory thermal and movement variations can be tracked.

In comparison with the PERCLOS system, an IR-CMS can provide continuous automated feedback to the individual and his supervisor of realtime measures of alertness and fatigue, as well as providing other indicators of performance ability such as attention to instruments, detection of drug or alcohol use, and identity. Compared to PERCLOS, IR-CMS removes the need for controlled illumination, removes the effect of lighting-induced artifacts, allows the use of lighting variations to stimulate the individual, and is completely passive. Compared to current physiological monitoring, IR-CMS offers a non-contact technique for assessing respiration rate, blood pressure, and temperature, and also provides blink rate, eye fixation patterns, head movements, and pupil dilation among other measurements, and detects stimulant use.

Facial identification using infrared images (thermography) provides automatic liveness testing; the subject must be alive and present at the time the infrared facial image is produced. IR facial analysis can also determine levels of anxiety and stress which may be associated with forced cooperation. As described in U.S. Pat. No. 5,163,094, and U.S. Pat. No. 6,173,068, to the present applicant, IRID® technology uses passive infrared imaging to observe both movements and thermal variations of features of the body, head, eye, and face to determine identity.

In one aspect, the invention is a method for monitoring and assessing the condition of human operators, using an infrared camera to provide passive thermal image sequences of the face of an operator. Features are extracted from each image in the thermal image sequences, and then analyzed to determine variation in temperature and position of the features on the operator's face. The analysis is used to assess a condition of the operator with respect to performance of a task.

The present invention expands the use of infrared imaging to condition monitoring to confirm that the subject is not only identified as being authorized to perform a certain function but that he is also capable of performing at a particular time. Observables from an infrared image or sequence of images are automatically assessed to determine whether a subject is present, alive, awake, attentive, responsive, anxious, under the influence of drugs or alcohol, or experiencing a medical condition—any of which may impair the subject's judgement or ability to perform. Assessment of an individual can be based upon comparison to personal baseline behavior and resulting thermal variations, or it can be based upon comparison to standards representing the behavior and thermal variations of collections of individuals.

The condition monitoring system of this invention uses infrared imaging of the face and other body parts to obtain observables used for automatic condition monitoring and assessment of human operators. Analysis of those observables provides early warning of potential cognitive or motor impairment and thereby facilitates risk reduction and quality maintenance. The automated infrared condition monitoring system (IR-CMS) can: a) assess cognitive and/or physical readiness to perform a particular task; b) provide condition assessment feedback to the subject and his appropriate supervisors; c) activate measures to increase short-term alertness and other readiness factors; d) limit potential risks by restricting the subject's access, responsibility, or authority; and e) facilitate rapid medical treatment, evacuation, quarantine, re-training, or counseling as appropriate. The same condition monitoring and assessment system can also be used during training and simulator exercises to evaluate personnel for assignment.

In accordance with the invention an infrared camera is located so that its field of view includes an individual who is to be monitored; such as the person driving a vehicle or using a computer terminal. The camera may be fixed at one location, with provisions for pan/tilt/zoom as needed, to view whoever is in the field of view. Or it may be mobile and be aimed at various persons as desired through manual or automated controls. Or it may be mounted (perhaps along with a microphone) on a headset, eyeglass frame, or helmet and aimed at the wearer's face. The system is turned on by a switch or sensor and the resulting sequence of image frames is processed to extract observables at intervals determined by the required timeliness of the assessment.

Some observables useful for condition monitoring could be obtained from standard visual or low light level cameras; however, those would not be obtainable in total darkness and would possibly be confused by lighting variations at different times of day and with variations caused by headlights, overhead lights, and changes in illumination from different computer displays. Other observables useful for condition monitoring could be obtained from contact sensors such as blood pressure monitors, or from active sensors such as radar EKGs. Those approaches generally require they be tailored to particular individuals and particular scenarios of use, and may interfere with the subject's performance or emotional state. The use of passive infrared image analysis provides a non-contact, non-interfering, general purpose approach without risk of contamination or injury.

The IR-CMS collects infrared images of the face, or other area of the body, and analyzes the following observables:

1. Presence of a subject is determined when analysis of the infrared camera output finds a warm area of the proper size and temperature, within the field of view of the camera, which illustrates expected distribution and variations in temperature over time. An example of an infrared output of a hyuman face, showing hot as white and cold as black, is shown in FIG. 1. Position of the subject is determined relative to the field of view of the camera and reference axis of the camera and in the image. For example, the presence of a driver in a vehicle is determined by the appearance of a warm body behind the wheel, as shown by item 1220 in FIG. 12. His position leaning right or left is determined relative to the camera on the dashboard, or on the steering wheel as shown by item 1205. Another camera on his side 1206 can determine his front-to-back posture.

2. Head movement choreography is defined as the sequence of head positions (rotation, tilt, and tip of the head through three-dimensional space) over a period of time. Reference axes are normally defined as shown in FIG. 2 by a horizontal line 201 through the hot canthi areas between the eyes, a vertical line 203 bisecting the horizontal axis, and a head rotation axis (not shown) through the top of the head and the neck. The range, locations, and timing of the sequence is analyzed as to variations over parameters (task, time, and person), as well as over other changing conditions such as the amount of sleep the person had, his age, his level of training for the task, his level of experience with the task, the urgency associated with the task, and so on. Both general and specific assessments can be made from head movement analysis. Examples include: 1) repetitive patterns of head movements, through a range of positions, with smooth transitions, indicates an attentive subject during periods of normal activity; 2) reduced range of movements, non-repetitive patterns, and jerky transitions during normal activity indicates an inattentive subject; 3) particular patterns of head movements such as nodding, and nodding followed by a quick raising of the head, can indicate drowsiness; and 4) changes in head movement choreography during the course of a work shift can indicate changes in level of attentiveness or fatigue.

3. Eye movements are analyzed if the infrared camera has sufficient thermal sensitivity and spatial resolution to distinguish the location of the iris or contact lens within the sclera area of the eye. The eye movement choreography is defined to include involuntary mycronystagmus or saccades, fixation point sequences when the head is stationary, and eye movements relative to a fixed plane when the head is moving. The eye choreography can be analyzed to determine what object or area is being looked at by the subject. The sequence and timing of the eye fixation patterns and eye+head movements can be readily determined for a particular task, time, and person. Eye movement choreography can be analyzed as to variations over parameters (such as task, time, and person), as well as over other changing conditions such as the amount of sleep the person had, his age, his level of training for the task, his level of experience with the task, the urgency associated with the task, and so on. Changes in eye movement choreography during the course of a work shift can indicate changes in level of attentiveness or fatigue.

4. Pupil size may be monitored from the infrared image if the camera has sufficient sensitivity and no eyeglasses or contact lenses are worn. This provides corollary information as to level of interest, level of darkness adaptation, and possible use of drugs or stimulants.

5. Blink rate and percentage of time the eyes are closed a certain percentage (such as 80% or more) are determined from the infrared image sequence, since the thermal profile of the eye is different for open and for closed eyes. The percentage of eye closure (PERCLOS) technique using illuminators and visual cameras is currently considered the most reliable method for assessing driver fatigue. However, the IR-CMS offers improved simplicity and broader application since it eliminates the need for controlled illumination.

6. Temperatures within geographic areas of the face, and changes to those temperatures, are analyzed to classify the condition of the face and to correlate observed changes in the face with changes in the ambient environment, or changes induced by other causes. The face is divided into a grid or finite element mesh of cells using the generalized bilateral symmetry of the thermal face to establish face axes. The apparent temperature of each cell is determined. The initial thermal map at the start of a period of monitoring can be compared to previous maps of the same operator or to standardized reference maps, to determine any areas of abnormality which may relate to medical or physiological conditions of interest. Simple analysis steps can include for example, monitoring the degree and location of bilateral asymmetries on a cell-by-cell basis, and analyzing changes in the rank ordering of cells by temperature.

Alcohol use causes a redistribution of heat within the face which can be observed through cell analysis. Over time, the redistribution proceeds after the ingestion of alcohol until it reaches a maximum depending on the amount of alcohol, the mass of the subject, and other variables. The redistribution then reverts over time until the alcohol-induced changes are no longer observable. Various other substances, physical activities, and emotional variations produce changes in the temperature distribution observed across the face cells. Patterns of changes may be classified by their degree, onset, duration, correlation with other observations, and the particular areas of the face involved. Migraine headaches, for example, may produce a repeatable asymmetrical pattern in the forehead of subjects prone to experiencing migraines. The onset of the migraine may be preceded by that particular pattern of change, providing early warning to the subject in time to take prophylactic measures. Use of alcohol, tobacco, or various drugs, toxic exposure, hypothermia, renal failure, diabetic shock, stroke, cardiac arrest, or epileptic episode are examples of conditions which may be detected and monitored through thermal analysis of face cells.

7. Temperature measurements at specific points on the face corresponding to specific underlying anatomical structures may be correlated with particular systemic or localized conditions of interest. Increased cortical functioning in particular areas of the brain may be observable through temperature variations at facial points overlaying vascular nodes which are connected to those areas of the brain by common vascular pathways. Some specific anatomical points correspond to pulse points, where the temperature fluctuation over time provides a non-contact measure of the pulse rate. Other specific points may include location of a skin tumor, scratch, abscess, burn, or other localized anomaly whose thermal behavior provides an indication of state of health. The monitored area may include another part of the body, such as a surgical or injection site. Reference locations can be established based upon standard anatomical branches of the vascular system which can be identified in the infrared image. Cell or point-level thermal changes can then be analyzed.

8. Movements of specific points on the face can be measured with respect to face axes assigned by considering bilateral symmetry, and distances referenced to the location of known anatomical points seen in the facial thermogram. Facial expression changes and speech-related changes cause movements in many areas of the face. Those movements can be tracked and measured by reference to the known anatomical points. When the same speech is repeated, variations in the degree and timing of movement can indicate differences in condition such as alertness and fatigue. Certain conditions of interest may correlate with specific movements of specific points of the face. For example, fatigue is often correlated with drooping of the lower eye lid, lower mouth and jowls. Use of certain drugs or alcohol can amplify the extent or slow the timing of certain movements such as those associated with smiling.

A blackbox may record the data for later analysis, either at the operator/task location or remotely. The blackbox recorder can be used in reconstruction of events, for tutorial use, and to assess the performance of the IR-CMS system.

The IR-CMS Analyses are directed toward task-specific goals. Examples are:

1. Determination of the presence of a person can be used to activate another device. A computer system log-on procedure may be activated. An access control system or ATM machine may ask for a PIN number.

2. For energy conservation and enhanced security, a display can be blanked when the computer operator is not looking at it, and re-activated as his head position and posture move into a display-viewing mode.

3. Changes in head location and posture over time provide data to the condition assessment subsystem, which among other functions looks for head movement choreography associated with fatigue and inattention. A truck driver's head movement choreography will change during a multi-hour trip. As fatigue occurs, he will reduce the range and frequency of lateral head movements associated with checking side mirrors and instruments. His head may drop down as he engages in microsleep. His level of familiarity with the route and with the vehicle will influence his head movements.

4. If eye location can be determined and monitored, the range and frequency of eye fixation patterns provides a measure of the person's level of attention and interest in the scene before him. If the size of the pupil can be determined, that provides further indication of the possible level of attention, as well as possible indication of the presence of drugs or alcohol. In the case of air traffic controllers, where a stationary infrared camera or an infrared camera worn on the person is dedicated to the controller, this provides for measuring a particular controller's ability to concentrate on a particular emergency incident while also being aware of the surrounding conditions.

5. Associating eye location with objects in the field of view provides for analysis of pilot response instincts when a plane or simulator is undergoing malfunction.

6. The eye movement choreography can be analyzed to determine whether a system operator is likely to detect alarm conditions if they occur. In the case of a security guard or control room operator attending to several display monitors, the combination of his head and eye movement choreography can be analyzed to predict his ability to detect significant variations in each display.

7. Abnormal variations in the temperature distribution among thermal facial image cells can indicate the effects of drugs, alcohol, stress, and various medical conditions, as well as ambient conditions. A pilot who drank alcohol within a couple of hours of appearing at the airport would show clear variations from his registered thermal image taken during a physical exam in which blood or urine analysis indicated no alcohol in his body.

8. Analysis of thermal variations over time must take into account the ambient environment. The cooling which occurs as the body falls asleep can be masked by changes in the surrounding air temperature. Alcohol and vasoactive drugs cause a redistribution of blood and therefore heat in the face. The redistribution reverts to a normal distribution as the substance is metabolized over time. Comparison of current imagery with previous imagery of the same person when he is known to have been free of alcohol and drugs provides a higher confidence in associating thermal abnormalities with substance use than does comparison with standard references based upon the general population. A truck driver who is becoming sleepy may stop for a cup of coffee. The thermal image will show the effects of caffeine for a period of time; on the order of 20 minutes, which is about the length of time that the caffeine will increase his alertness.

9. Stimulus response may be evident from the thermal image of the face. Embarrassment, fear, stress, exertion cause changes in blood flow, which may be detected, from a thermal image. As infrared cameras become increasingly sensitive, they will enable the detection of even more subtle increases in localized blood flow. Since the facial blood vessels are directly connected to blood vessels in the brain, and the "wiring diagram" is known, minute thermal variations in particular areas of the facial image can be correlated with activity in particular areas of the brain. This will provide further realtime information about the cognitive processing of the operator.

10. Even low-resolution infrared cameras, with sufficient sensitivity, can determine respiration rate. If the infrared camera is sensitive enough, with a fast enough framing rate, the system can obtain instantaneous blood pressure at key points on the face.

11. The thermal distribution across the face changes when a subject is intentionally being deceptive in his answers to questions. By correlating the time such changes appear to the time a particular question is asked, a subject may be determined to be deceptive with regard to that question.

The results of IR-CMS analysis can be used to activate a stimulus or trigger an event. Stimulus events or tasks can be designed which induce movements and thermal changes in order to calibrate or alter the subject's condition. A truck driver whose head and eye movements indicate declining alertness can be stimulated by sound or odor. The extent and timing of his response to the stimulus can indicate whether his condition is that of being inattentive or sleepy; allowing for selection of specific additional corrective actions. A student pilot flying a simulator shows normal respiration and temperature. Various simulated problems, such as malfunctioning fuel gauge, are introduced and his responses are evaluated to determine his suitability as a pilot. An applicant is answering questions presented on a computer touch-screen display by tapping his selected answers. His head and eye movements, pupil size, thermal changes, and time to select an answer are analyzed to find possible topics where his answers may be deceitful. The stimulus event may be the repeating of those or related questions, to add further confidence to the determination that the applicant is being deceitful about that topic.

The components of a preferred implementation of the invention are the following:

The IR-CMS Feature Extraction Subsystem determines: presence of the subject, location of head, face, eye, face features, and minutiae locations, temperature in regions and at points of interest, and variations of all those measurements over time.

The Analyzer and Assessment Subsystems perform:
Acquiring IR imagery of area including operator
Finding head and face in image
Locating face axes using bilateral symmetry and
Locating facial features: eyes, mouth, thermal minutiae
Dynamic tracking of head tilt, rotation, tip over time
Dynamic tracking of facial features and thermal minutiae micromovements
Dynamic tracking of eyelids and analysis of closure percentage over time
Determining face cells and dynamic thermal variations over time
Correlating head, face feature, eyelid movements with activities and conditions
Correlating head, face feature, eyelid movements with standards obtained from a group of operators performing similar tasks
Correlating head, face feature, eyelid movements with earlier movements when presumed to be more awake and doing the same task; a personal baseline comparison
Correlating thermal variations with standards obtained from a group of operators performing similar tasks
Correlating thermal variations with earlier data when presumed to be more awake and doing the same task; a personal baseline comparison
Assessing degree of drowsiness or inattention, or level of cognitive readiness
Providing feedback to operator
Activating stimuli to affect the operator's condition directly such as blowing cold air or pungent odors.
Activating changes in the operator's tasks such as requiring operator make a vocal response, reducing the maximum speed of the accelerometer, allotting only a certain number of aircraft to be controlled, blanking a computer screen and requiring re-logon, directing that a baggage screener take a break.
Removing control of the task from the operator such as putting a plane on autopilot, not allowing vehicle ignition if operator is assessed as being impaired, not permitting certain critical commands to be executed from a command post until another authorized and fit person is at the controls.
Remote transmission to an operations center which monitors operator performance and can activate necessary response measures
Testing of operator using a stimulus and requiring a response
Assessing cognitive readiness based on reaction time, facial micromovements and thermal changes during the stimulus-response interval Other components of the IR-CMS System include: infrared camera, controlled space, optics, image buffer, reference clock, and devices for feedback to the operator, transmission to remote sites, stimulus and trigger mechanisms, computer processors and interconnecting cables and other communications devices.

Specific embodiments of the invention are described hereafter and include systems for: First, truck driver and airline pilot fatigue monitoring; Second, air traffic controller and baggage screener performance effectiveness monitoring; Third, emergency response force personnel stress and physical status monitoring; and Fourth, applicant and interviewee screening for deception. The IR-CMS can be embedded in a fixed location such as a security system display. It can be installed in a mobile platform, such as a truck or plane cockpit. It can be attached to a wearable computer on a headset or helmet. Condition monitoring and assessment analysis can be done at the subject's location or remotely. The sample embodiments are intended to illustrate some of the possible applications for the IR-CMS. Numerous other applications will be obvious to those skilled in other fields where human performance is crucial to safety, security, effectiveness, and profitability.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
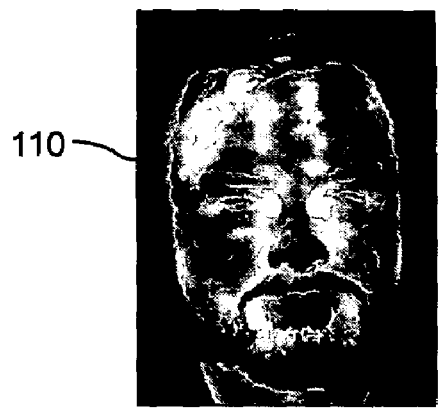
FIG. 1 is an infrared, or thermal, image of a subject's face shown in grey levels where white is the hottest and black is the coldest.

Facial thermography has been shown to be a reliable technique for identification of a person's face. The human face typically exhibits thermal variations on the order of 7° C. across the facial surface. The source of the body's heat is primarily the warm blood which is pumped throughout the body's vascular system. Extensive testing has proven the uniqueness and persistence of features of the facial thermograms which are used for identification. During testing of the IRID® technology, subjects experienced changes in ambient temperatures, degree of exercise, alcohol, and stimulants. They were also observed in conditions of fatigue, inattention, sleep, excitement, and anxiety. The goal of the testing was to demonstrate that automated identification based upon infrared image analysis was not affected by those variations in condition.

Identification of an individual can be performed through analysis of the structures of the thermal patterns seen in an infrared facial image, while at the same time the individual's condition can be monitored and assessed through analysis of the temperature variations at specific anatomical locations. Thus the same infrared images can be used for either identification or condition monitoring or both. The anatomical sites used for identification include the branch points of superficial blood vessels in the face, pulse points of the face and neck, junctures between the ears and head, nostrils, eye corners and canthi, eyebrows ridges and cranial hairlines, mouth areas, wrinkles and creases, moles, scars, sweat pores and hair follicles. The location, characteristics, and couplings of those sites as seen in thermal images is unique to an individual.

Heat is produced as a byproduct of metabolic activity, biochemical changes such as are associated with fatigue, stress and anxiety, biological processes such as inflammation due to infection or injury, vasoconstriction and vasodilatation caused by various drugs and alcohol, and acute toxic response to hazardous agents. Current infrared cameras can measure temperature changes of as little as 0.01° C., and translate them into different levels of gray in the output signal at each of 640×480 pixels per frame, representing a spatial resolution of better than 0.02 inches. They can generate 900 frames per second of 14 bit digital imagery. That level of sensitivity provides early detection of the onset of thermal changes associated with fatigue, stress, anxiety, injury, toxic materials response, oxygen deprivation, and many other conditions which may cause cognitive and/or motor impairment. The study of thermogenesis considers molecular heat activity at the cellular level. At a macroscopic level, the impact of such effects can be seen in the human face and other body parts. Even minor anxiety produces detectable thermal variations. Infrared cameras with high magnification lenses can be used to watch sweating begin at individual pores, thereby offering a new level of stress monitoring sensitivity.

In the present invention, dynamic imagery from a passive infrared imaging system is analyzed to determine the Presence, Position, Structure, Movements, and Thermal Variations of any head, face, eyes, hands, or other body parts within the field of view of the imaging system. The system utilizes thermal facial symmetry to determine the presence of a face within the field of view, establish face axes, and track movements over time of those axes. Within the facial image, movements of eyelids, direction of gaze, and micromovements of specific facial reference points over time are analyzed. The system also determines relative apparent temperature variations across the face and over time. The combination of Thermal and Movement Analysis provides real time indication of the imaged person's presence, level of alertness, point of attention, level of fatigue, level of stress, cognitive readiness, and other condition factors. The system has the advantages of being passive, non-intrusive, and non-contact. It can be operated under any lighting condition, including total darkness.

The IR-CMS system may passively observe, analyze, and report the assessment of the subject, or it may interactively notify the subject or affect the subject's task, controls, or operating environment. Further assessment can be used to provide feedback to the subject, institute automated local response measures, or transmit the information to remote locations. When the system detects fatigue it could, for example, generate certain odors and music known to increase alertness in a truck driver's cabin.

The IR-CMS can trigger or control other devices such as air bag inflation sensors; and can be used to evaluate operator performance under simulated or actual training scenarios such as monitoring the level of stress and response time of a fighter pilot during simulated or actual combat.

Figure 2:
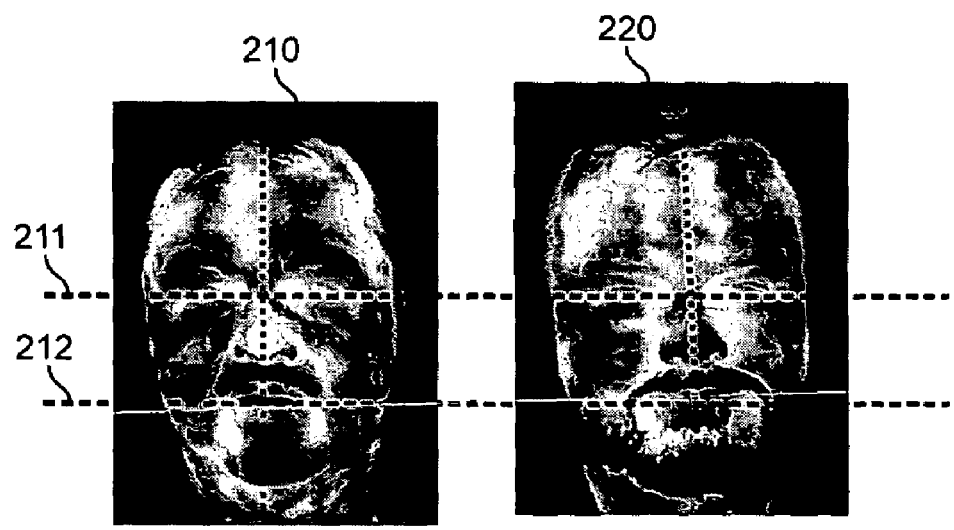
FIG. 2 shows the establishment of face axes for two different subjects.

Referring now to the drawings, and more particularly to FIG. 1, there is shown an infrared, or thermal, image 110 of a subject's face shown in grey levels where white is the hottest and black is the coldest. FIG. 2 shows the establishment of face axes for infrared images of two different subjects (210 and 220), using the eyeline 201 and perpendicular 203 through the center of the canthi. The eyeline and canthi are preferred reference points but may be hidden behind glasses, in which case the mouthline 202 and nostrils are used to establish the axes. Scaling can be performed using the spacing between canthi or pupils, or between mouthline 202 and eyeline 201. The mouthline-eyeline approach has the advantage of working for frontal, profile, or angle views. In this illustration, the eyeline 201 and mouthline 202 are parallel for both subjects.

Figure 3:
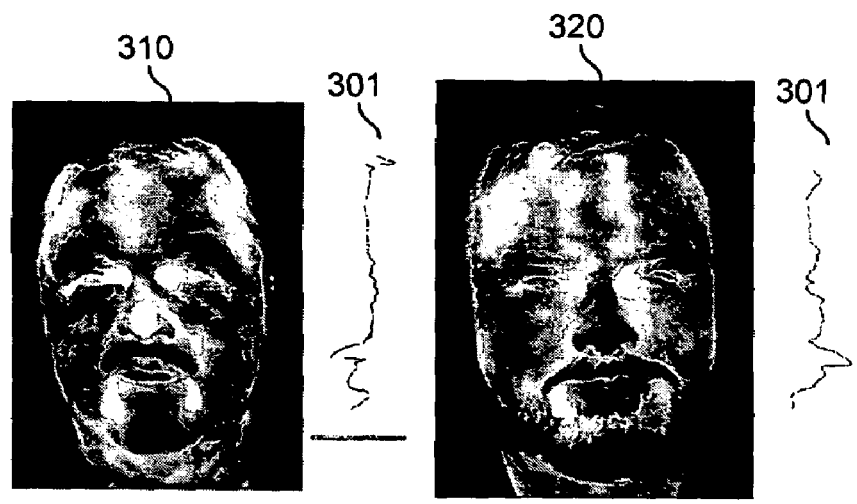
FIG. 3 presents symmetry waveforms for each subject.

FIG. 3 takes the infrared images of FIG. 2 and presents to the right of each image (310 and 320) symmetry waveforms 301 for each subject, where the eyeline or mouthline is made horizontal and the best point of symmetry is selected for each horizontal line along the vertical axis. The symmetry waveform 301 is computed within a vertical track whose width is selected such that that portion of the face will remain within the field of view of the camera as the subject performs his expected activities. The symmetry waveform moves with the head, providing an alternative reference frame to the face axes. Localized thermal variations in the face will produce localized variations in the symmetry waveform, providing a quick method for determining which areas of the face require further analysis to evaluate changes in condition.

Figure 4:
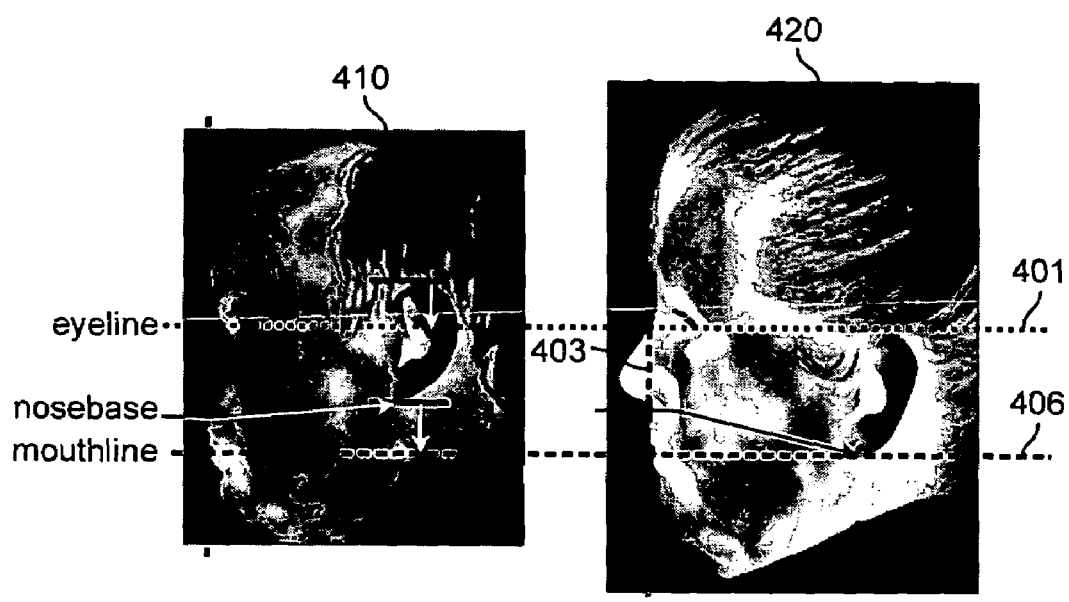
FIG. 4 is a profile thermal image of two different subjects.

FIG. 4 is the profile thermal image of two different subjects, showing the use of eyeline 401 or mouthline 402 axes for the horizontal reference and the use of eyebrow ridge to lips line 403 for the vertical axis. The outer corner of the eye is used to establish the eyeline 401. The distance between eyeline 401 and mouthline 402 is used to scale the images to a standard if desired. For certain applications, the use of profile images, as shown in FIG. 4, is more convenient or effective than the frontal images which are shown in FIG. 3.

Figure 5:
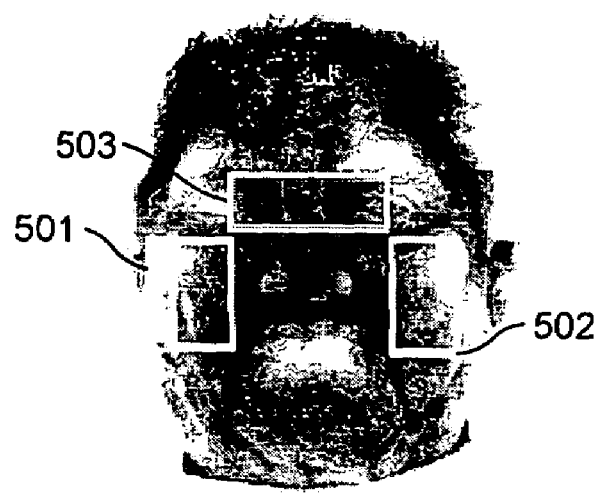
FIG. 5 shows three cells drawn to encompass specific features on the thermal image.

FIG. 5 shows three cells (501, 502 and 503) drawn to encompass specific features on the thermal image. For convenience in identifying the cells, the image has been inverted, so that hot corresponds to black and cold corresponds to white. The entire face can be segmented into cells which can be all equal dimensions, can be triangular or other shapes, or can be irregular shapes and sizes. The essential element is that they be repeatably drawn for a given individual.

Figure 6:
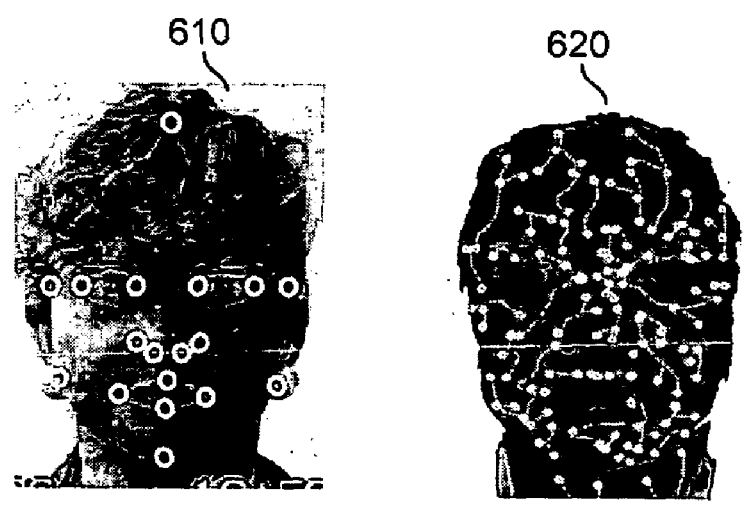
FIG. 6 shows minutiae drawn on visual and thermal images.

FIG. 6 shows dozens of minutiae drawn on the thermal image 620 on the right. These particular points were selected at the branching of blood vessels, which can be seen in the infrared image as hot (white) lines. Rather than choosing points which can be directly selected from the infrared image, points can be derived, such as by calculating the centroids of thermal contours. For reference, visual minutiae are drawn on a corresponding visual image 610, illustrating that there are many fewer natural reference points available in the visual image.

Figure 7:
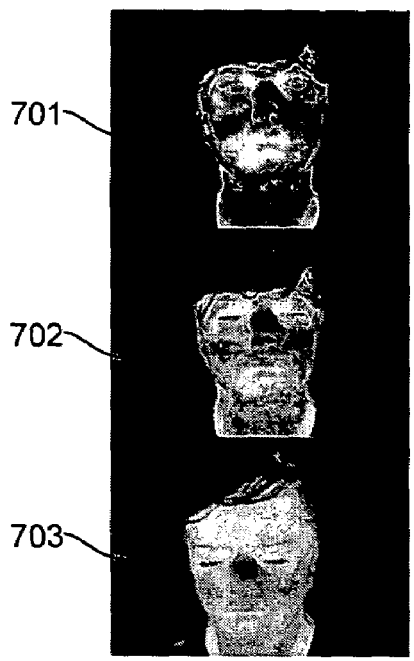
FIG. 7 presents three frames of a sequence during which a driver falls asleep.

FIG. 7 presents three frames of a sequence in which a driver falls asleep. The top infrared image 701 shows eyes wide open, head erect, and a particular temperature distribution across the face. The middle image 702 shows the eyes closed, a slight drop of the head, and cooling in the cheeks. The bottom image 703 shows the head down and twisted, the eyes shut, and further cooling in the cheeks. Changes in respiration rate, blink rate, and other thermal and movement observables might also be collected during this sequence. One goal for application of the IR-CMS would be the detection of the onset of symptoms shown in the middle image 702, and intervention to prevent the subject from reaching the bottom stage 703.

Figure 8:
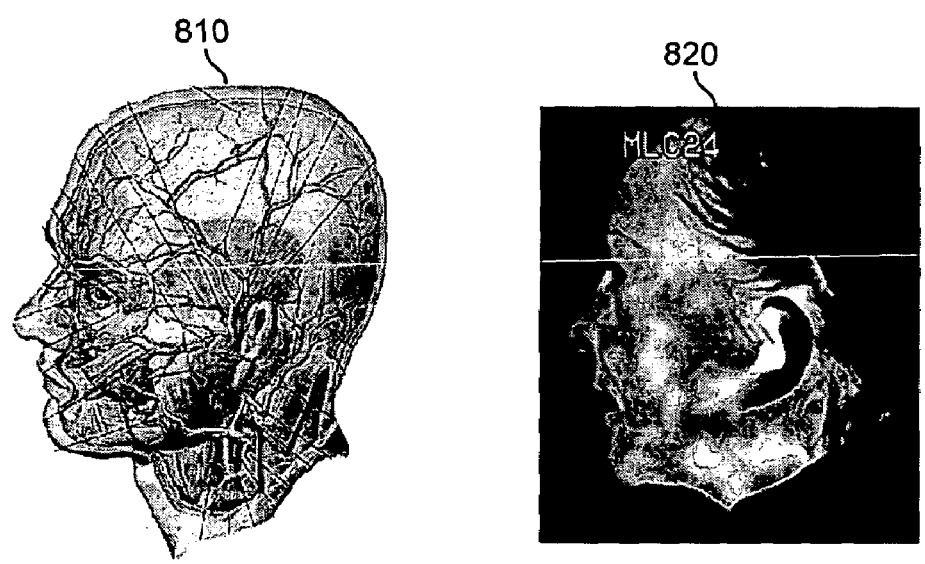
FIG. 8 illustrates the superficial vascular structure of the head and a facial thermogram showing some of the corresponding structure.

FIG. 8 illustrates the superficial vascular structure of the head 810 which is the primary source of the patterns seen in a facial thermogram, and a facial thermogram 820 showing some of the corresponding structure.

Figure 9:
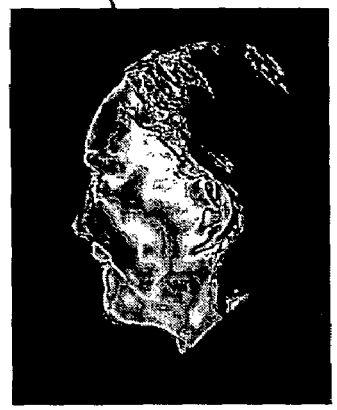
FIG. 9 presents the thermal images of a subject prior to and after the ingestion of 10 ounces of wine.
Figure 9:
Figure 9:
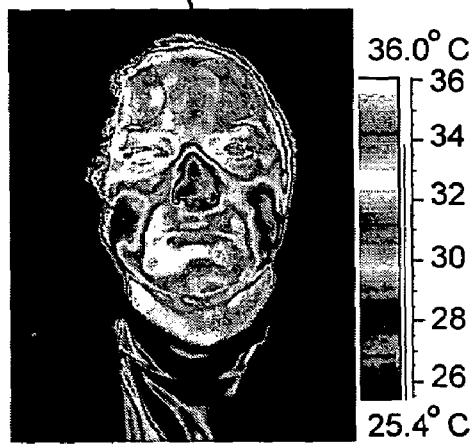
Figure 9:
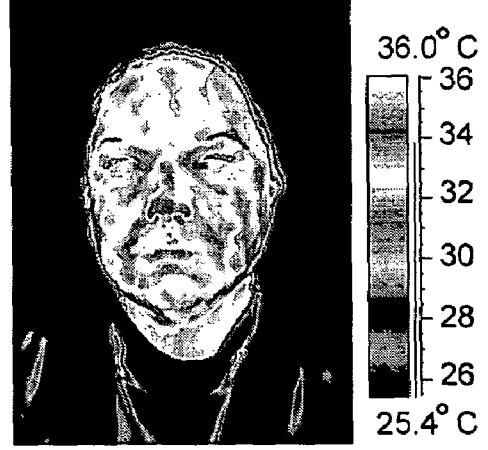
Figure 9:
Figure 9:

FIG. 9 presents the thermal images of a subject prior to and after the ingestion of 10 ounces of wine. The images on the left (901, 902 and 903) are prior and those on the right (911, 912 and 913) are post. The distribution of heat in the face can be analyzed at one or more pairs of selected areas or location points. The distribution will vary from a baseline normal, non-alcoholic, state to a difference distribution after the drink, and will then eventually revert back to the normal distribution. The timing of the changes, extent of the changes, their latency and decay rate at different locations can provide detailed evidence as to the type and amount of alcohol consumed. When a baseline thermal image is available for a given subject, the assessment of alcohol or drug use can be more accurate and precise than when the assessment must be made based upon statistical analysis of thermal distributions among a population of other subjects.

Figure 10:
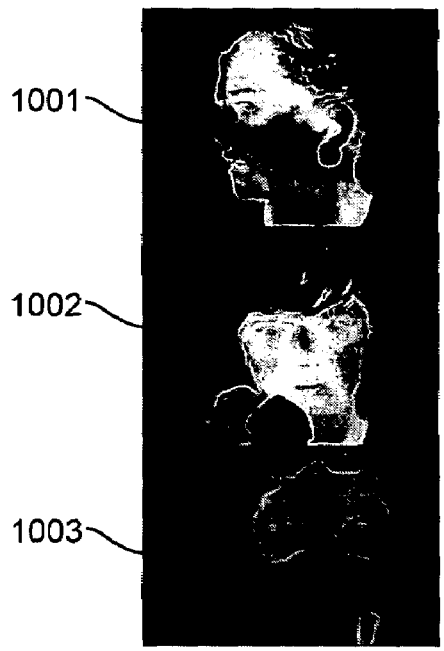
FIG. 10 illustrates several changes in condition which can be determined from analysis of the thermal images in total darkness and with no intrusion into subject's activities.

FIG. 10 illustrates other changes in condition which can be determined from analysis of the thermal images in total darkness and with no intrusion into subject's activities. At the top 1001, the movement of head and eyes can be clearly determined. In the center 1002, an overall warm flush to the face coupled with the presence of a cold can in the field of view and a cold mouth provides evidence of an alcoholic drink. At the bottom 1003, a uniform cooling of the face while drinking from a cold container indicates a non-alcoholic drink. In each case, a time sequence of image frames provides more specific condition analysis than is obtained from a single frame shown here.

Figure 11:
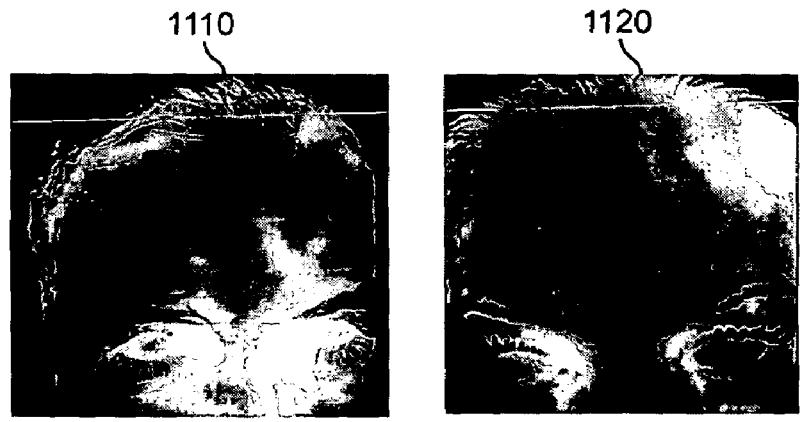
FIG. 11 illustrates the amount of detail available in a partial facial image.

FIG. 11 illustrates the amount of detail available in a partial facial image. Depending on the particular observable to be used, the infrared camera can be directed such that its field of view encompasses only part of the face, as in the left image 1110 which shows the nose and above, and as in the right image 1120 which shows the eyes and above. In certain applications, such as when the camera is worn on the helmet of a firefighter or on the microphone stalk of a soldier, only a portion of the face may be seen. The ability to use a small detector array in cameras which image only a partial face results in major cost savings in the IR-CMS systems.

Figure 12:
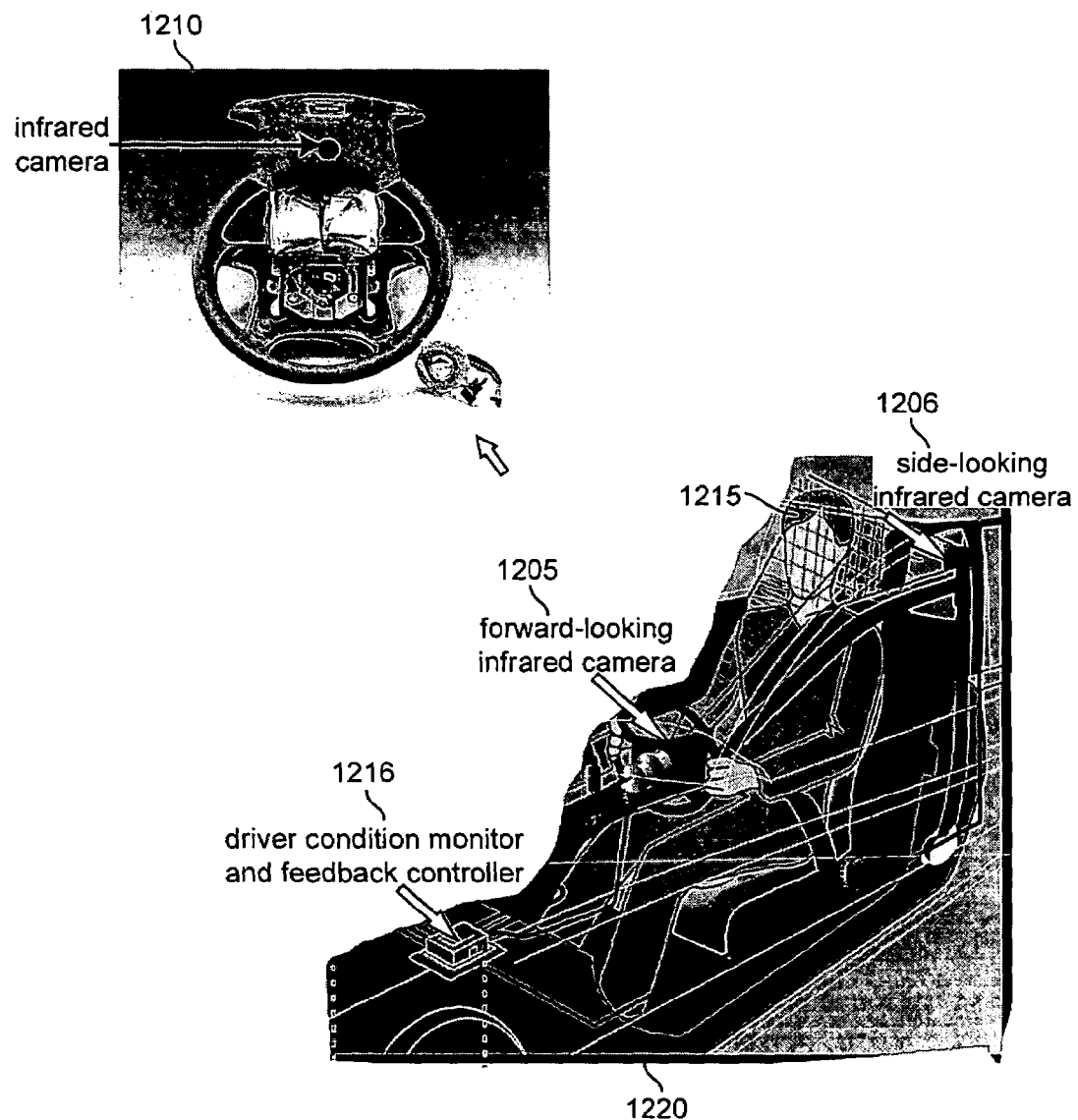
FIG. 12 is the layout for a driver monitoring system which has infrared cameras both in front and to the side of the driver.

FIG. 12 shows the layout for a driver monitoring system which has infrared cameras both in front 1205 and to the side 1206 of the driver 1215, installed in the compartment 1220 with the airbags. A cutaway 1210 shows the steering wheel from compartment 1220. In a low-cost implementation, two low-resolution infrared cameras 1205 and 1206 observe the presence of a driver, his height and cross-section to the camera, his body posture in terms of being up straight or leaning, his distance from the steering wheel and the angle of his seat back, his head movement choreography, and the gross thermal distribution across his face. The IR-CMS analysis determines: changes in head movements, including head nodding, variations in temperature, and changes in body posture which may indicate fatigue or inattention. Serious and abrupt changes in temperature and body movements could indicate critical situations such as stroke, heart attack, or seizure. The analysis is input to response activators, such as odor generators and audible alerts, and is also input to the airbag inflation processor. The decision whether to inflate the airbag upon sudden deceleration, the force of the inflation, the timing and direction of the inflation can be optimized based upon the parameters from the IR-CMS.

Figure 13:
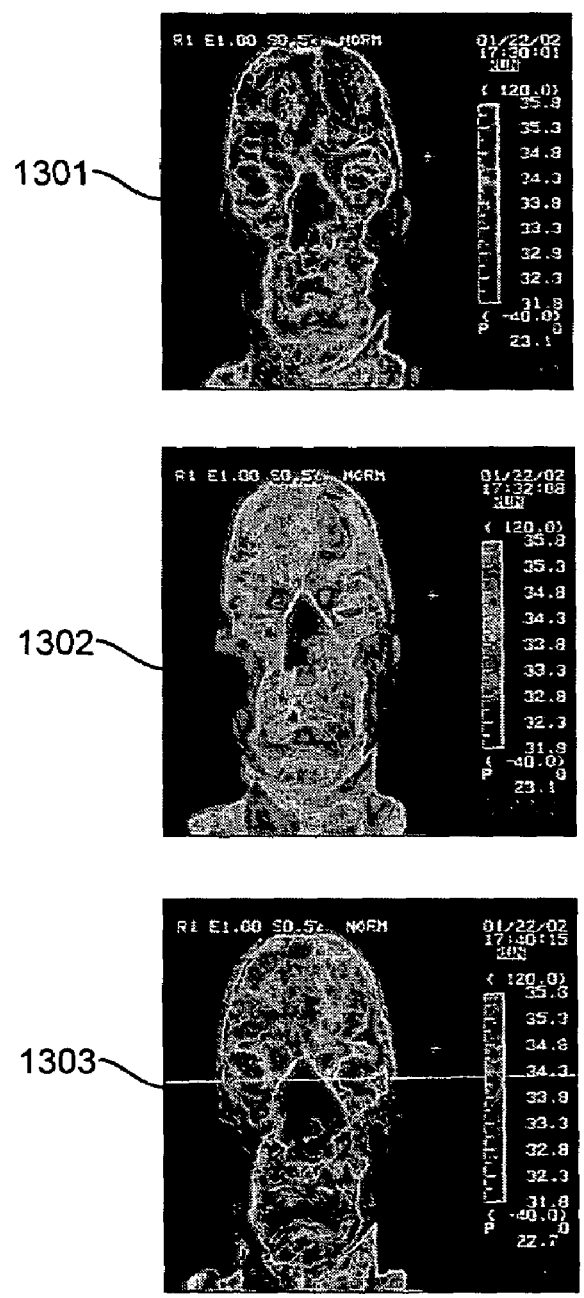
FIG. 13 shows a subject who exhibits a generalized anxiety about being questioned.

FIG. 13 shows a subject who exhibits a generalized anxiety about being questioned, as indicated by the distribution of temperature in the face in the top image 1301. Upon being asked a question which causes him stress, within two minutes (as indicated in the time reference) he exhibits the second image's 1302 thermal pattern which shows warming at the canthi, forehead, and chin. Eight minutes after his questioning is completed, he exhibits the bottom image 1303, showing a loss of both the intense stress and the generalized anxiety patterns, with overall cooling.

Figure 14:
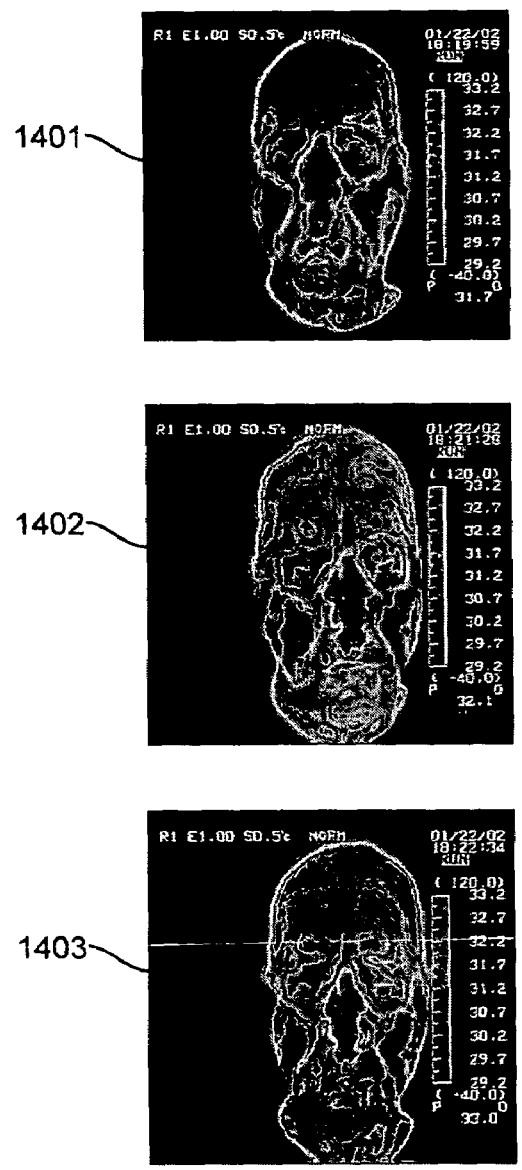
FIG. 14 shows the response of a subject to stress during questioning.

FIG. 14 shows a subject who is relaxed prior to questioning, with overall thermal symmetry, as shown in 1401. When a particular question causes him stress, he exhibits the second image 1402, showing a similar reaction to the subject in FIG. 13 within one minute, with the canthi warming, the forehead heating up even more, the nose also warming, and the lower face warming slightly. One minute after his questioning is completed, he retains much the same peak indicators of stress. The pattern of questioning needs to take account of the personal variations in reaction and recovery times to ensure that observed thermal reactions are allocated to the correct question.

First Embodiment

Vehicle Operator Monitoring

It is an object of this invention to provide a method and apparatus for the realtime monitoring of vehicle operators to determine conditions which may interfere with their ability to successfully and safely control the vehicle, and to mitigate potential damage. Such conditions include: fatigue, inattention, inebriation, toxin exposure, diabetic shock, epileptic seizure, other medical traumas, and anxiety caused by physical ambush or emotional state.

Extensive driver fatigue studies performed under Department of Transportation auspices have demonstrated that time of day, duration of shift, sleep and cumulative sleep amounts, regularity of work schedule, and general health status all contribute to an individual's cognitive readiness. It has also been demonstrated that self-awareness of a person's level of fatigue or other incapacitance is surprisingly low. Although those studies involved truck drivers, the same conclusions are expected to relate to performance of other operators, including pilots, bus and automobile drivers.

Infrared cameras look and operate like standard video cameras, but are only sensitive to heat emissions, not to the visual images seen by the human eye. They record the heat constantly emitted through a person's skin. IR cameras are passive; they don't emit anything and don't require any light or other activation in order to produce an image of any part of a person's body.

Use of new low-cost infrared cameras, similar to those used in automobiles to enhance night driving, can provide continual monitoring and assessment of a person's condition. That information can be used to provide feedback to the person, institute automated response measures, and transmit the information to remote locations. With a higher performance IR camera, the identity of the person can also be determined. The two functions of ID and CM can be performed using same IR images. ID requires that the person be known and previously enrolled in the system. CM does not require that the person be known, although certain medical conditions can be more precisely assessed if data is known about the individual, his tasks, and the work environment.

Blockage of the carotid artery causes asymmetrical cooling of the forehead. If it is known that the subject suffers from coronary disease, the IR-CMS may generate feedback to the subject when even a minor increase in forehead thermal asymmetry is detected. If it is known that the subject suffers from migraine headaches, the IR-CMS may generate feedback to the subject as soon as there is any evidence that the characteristic "chi" pattern is developing. If the individual is known to be a HazMat worker who will be wearing protective gear, the IR-CMS may suppress warning feedback until the subject reaches a higher temperature than if he were not wearing protective gear. However, it may activate oxygen flow or provide feedback to remote response persons upon a more slight detection of elevated stress than if he were not performing such a hazardous task. Any combination of thermal and location feature data which constitutes a signature which is highly correlated with a medical condition, either for a particular subject or in general, is considered a medical status indicator.

Dynamic imagery from a passive infrared imaging system is analyzed to determine the Presence, Position, Movements, and Thermal Variations of a head, face, and eyes within the field of view of the imaging system. The system utilizes thermal facial symmetry to determine the presence of a face within the field of view, establish face axes, and track movements over time of those axes. Within the facial image, movements of eyelids, direction of gaze, and micromovements of specific facial reference points over time are analyzed. The system also determines relative apparent temperature variations across the face and over time. The combination of Thermal and Motion Analyses provides real time indication of the imaged person's presence, level of alertness, point of attention, level of fatigue, level of stress, and cognitive readiness. The system has the advantages of being passive, non-intrusive, and non-contact. It can be operated under any lighting condition, including total darkness.

The IR-CMS device is designed to be installed in a fixed location within the cab of a commercial truck and interfaced to the ignition system and to a satellite transponder. FIG. 12 illustrates the use of two infrared cameras within the driver compartment. One side-looking camera 1206 is affixed to the door post. A second 1205 is installed with the air bag in the steering wheel hub. Both these are directed to observe the subject's head 1215. Data from both cameras is fed to the IR-CMS components 1216 (driver condition monitor and feedback controller) installed within the dashboard. The system may passively observe, analyze, and report its assessment of an individual directly to him through visual or auditory display. It may also interactively affect his task, controls, or operating environment. When the system detects fatigue, inattention, stress, or other condition which may lower the worker's capability to perform critical tasks, that assessment can be used to restrict his access to certain information and controls for as long as his condition persists. For a driver or pilot, the assessment of fatigue can trigger turning on lights, audio broadcasts, vibration sensors, or odor generators in an attempt to increase his alertness and level of performance. In the simplest applications, persons who appear to be under the influence of alcohol or drowsy are not able to turn on the ignition of the vehicle.

FIG. 7 shows infrared images of a driver when he is alert (701), drowsy (702), and asleep (703). Observables used by the IR-CMS to determine those conditions include: blink rate, percentage of time eye closures are more than 80%, eye fixation pattern distribution over time, head movement distribution over time, pupil size over time, movements of facial areas, temperature distribution across the face, trends in temperature redistribution, temperature variations at anatomical reference points such as pulse points.

FIG. 9 shows facial images before and after six ounces of wine. The temperature distribution pattern shows obvious changes. The changes in temperature distribution are similar from one person to another. The pattern reverts to normal over a period of time determined by the amount of alcohol consumed, the size of the person, metabolic factors associated with the individual's physiology and recent eating, level of activity and other factors.

FIG. 10 shows observable changes related to the activities of turning the head and looking away, talking on a phone, and drinking from a cold can. Head and eye movements automatically determine the first of these activities. The presence of a relatively cold object of a certain size against the side of the mouth, and lip movements like those during speech automatically determine the subject is talking on a phone. The presence of a cold can-sized object near the face, plus the temperature sequence showing the suddenly colder lips followed by a whole-face change in temperature automatically determine that the subject is drinking a cold beverage. The pattern of changes in the thermal face image indicates that the drink is not alcoholic.

Second Embodiment

Monitoring Effectiveness of Persons Using Computer Displays

It is an object of this invention to provide performance quality monitoring of persons whose tasks require them to make rapid decisions based upon computer-generated displays. Reliable, error-free performance of interactive systems which scan airport baggage or computer networks which control air traffic is a serious concern. Monitoring the condition of the human operators of these systems is likewise an important use of ID-CMS. Commercial network security monitoring tools are available which map the network's topology and display network performance data for analysis. The network tool shows network activity and appends information on each terminal. It also shows both physical and virtual relationships; who contacts whom, communication paths, traffic flow and density.

During an attack on the network, the related activity can display an explosion of simultaneous problems—causing extreme stress to the network administrator. During normal conditions, the lack of any interesting activity can cause the administrator to become inattentive and miss a critical indicator. The IR-CMS add-on module provides biometric identification security at log-on and continuously during terminal use. In addition, the system performs condition monitoring to assure that the administrator is alert and attending to the system. Each action he performs can be recorded and annotated with his ID, date and time, and any apparent indicators of stress, anxiety, or fatigue.

Airport baggage screeners face similar periods of peak activity and periods of minimal activity, with the possibility of threatening incident occurring during any time interval. Unlike with the air traffic controller, an adversary may be able to select a screener who appears inattentive or with whom he has arranged that his baggage be passed. IR-CMS systems would incorporate an IR camera on top of the security scanner display. The system would be triggered when an item of luggage is placed on the conveyor belt. The screener's eye fixation pattern, blink rate, pupil size, head movement choreography, and temperature distribution across the face would be monitored. The complexity of the displayed image would be considered by the system and the screener's data would be compared to those parameters from experienced screeners considered to have excellent performance on images of the same complexity. Test items of baggage incorporating test targets inside can be used to compare screeners' performance over time and to evaluate applicants for screeners positions.

The IR-CMS condition assessments indicate the impact on screener performance resulting from changes to the baggage scanner system such as: larger display monitors, higher sensitivity metal detectors, and highlighted high density objects. Also, the realtime assessments can be used to rotate screeners to performing passenger scans and taking a break when their alertness falls below an acceptable level.

Many other critical tasks involve human review of events and status information presented on computer displays. IR-CMS system capability is especially suited to deal with distributed decision making during crises. Scenarios include the need for portable terminals, under conditions involving darkness, noise, multiple speakers, and possible on-lookers to the displays. Features of IR-CMS deal with those requirements as well as the need to assign confidence levels to information provided by persons possibly suffering from stress, anxiety, fatigue, toxic exposure, or other medical condition.

The ID/CMS system continually re-verifies the identity of the system user, and confirms his authorization level prior to each action he performs. Tracking the head and face axes permits normal head and body movements within the field of view of the camera. However, the system automatically blanks the screen, locks the keyboard and peripheral devices if the user moves out of the field of view of the camera, or does not look at the display for a programmable period of time.

The infrared vascular pattern provides a digital signature which can be used to tag files created or accessed. Once logged-on, the system does not interfere with the user other than to control activities based upon prior authorizations, as long as the user remains alert, attending to his duties and not evincing indications of anxiety, stress, or medical trauma. If such a condition is detected, the system can activate a variety of responses and alerts to maintain or re-establish the security of the network and ensure passenger and vehicle safety.

Advantages of the ID/CMS system are that it:
Continuously assesses the condition of critical task personnel during routine and crisis situations without disrupting authorized activity;
Operates even in dim light or darkness and is independent of skin tone;
Provides biometric security and digital signature auto-tagging of actions taken;
Can maintain system status during transfer to another authorized group member; and
Can automatically require additional confirming input or repeated commands from a user who is fatigued or inattentive.

For monitoring of command and control center operators, the CMS will be fixed mounted at the display and interfaced to log-on and other security procedures.

Third Embodiment

Monitoring Stress Level and Physical Condition of Emergency Response Personnel

It is an object of this invention to provide a method and apparatus for monitoring the health and safety of emergency response and military personnel. For these applications, the IR-CMS is man-portable and interfaced to a wearable computer with headset communications. The sensor head of the IR camera is separated from its electronics and battery, and is mounted on a helmet or headset from where it views at least a portion of the face.

The system monitors the wearer's face temperature and movements of the eyes and areas of the face including the mouth, nose, and eyebrows, as well as temperature and movements of anatomical subsurface features associated with physical activity (eating, talking, smoking, smiling, grimacing with exertion) and psychological state (pain, fatigue, drunkenness, sleep). The extracted observables are analyzed to assess whether the subject's status is within operating parameters for him as an individual, for his current task, and for activities he is projected to be required to perform during the next interval of time.

The system can activate devices built into the subjects uniform, such as inflator cuffs or oxygen mask or heater coils, in response to assessed condition. The system can also instruct the subject through audio link to take other corrective actions, such as using a drug, syringe, defilbrator, or other device he carries. The system can also transmit his status information to the squad leader or to other response force. The system continues to assess the subject and intervene as needed.

In addition, the system can identify the subject from his infrared facial image to insure that an authorized person is wearing the system. This prevents an adversary from gaining access to the communications link.

Fourth Embodiment

Screening Interviewees and Applicants to Detect Possible Deception

It is an object of this invention to provide a means for rapidly screening persons being interviewed to detect possible deception. Collecting and assessing information from human sources requires a determination of the veracity of the source. Such a determination can be especially difficult when the investigator does not know the subject, when the investigator is not skilled at recognizing deception, when the subject is under the influence of drugs or alcohol or stress unrelated to the questioning or when the subject is skilled at deception. Existing technical methods to enhance trained visual assessment of stress (e.g., body language, sweating, gestures, eye movements) include voice stress analysis, remote EKG through K-band radar, eye fixation patterns analysis, chemical sniffing, and galvanic skin response. The thermal analysis methods of the present invention provide for the detection and monitoring of observables related to emotional and physiological stress: 1) facial movements, 2) thermal variations, and 3) sweating. The methods are applicable even in uncontrolled collection locations and in spite of head movements by the subject. Furthermore, the use of standardized thermal minutiae facilitates comparison of multiple event questioning of the same subject, as well as development of reference standards. The use of a remote-head IR camera in association with a processor and recorder offers a potentially significant improvement in covert polygraph accuracy and fieldability.

FIGS. 13 and 14 illustrate the whole-face thermal variations which occur when a subject is being deceptive about a topic and feels stress as a result. In each figure, the center image (1302 and 1402) represents a period of deception stress. Whether the subject is in an anxious or stressful state prior to being questioned, he displays additional stress coincident with being asked about that topic. The subject should be allowed to revert to his previous level, if possible, prior to being asked another potentially stressful question in order that the system can better analyze the degree of stress resulting.

When used for polygraphy, IR-CMS extracts points that correspond to specific anatomical locations, such as those associated with pulse measurements and with facial muscles, and tracks both their movement and thermal variations. The essential features of the technique are the following: uniqueness and invariance of facial thermal minutiae; use of a passive, remote imaging technique to obtain subsurface details; use of automated minutiae extraction to determine and track specific anatomical locations in spite of head movements and facial expression changes; ability to utilize these standard reference points for comparative analysis of the same person at different times and under different conditions; and, use of standardized minutiae locations to compare the micromovements and thermal variations of various persons to a set of reference signatures. The minutiae tracking technique involves extracting the same consistent points in successive frames of infrared video, performing afine translations of one image into the next, and measuring the degree of translation and the degree of thermal difference as indicators of the amount of difference at specific minutiae locations which correspond to pulse points or to facial muscles and nerves related to stress micromovements. The minutiae extraction and annotation procedure locates the position and apparent temperature of each minutia. When sweat pores are used as minutiae locations, the technique can monitor those points to detect even the slightest signs of sweating.

The IR-CMS can be used to screen applicants for positions of trust, or to preprocess persons through customs, immigration, airport security, and other processes which normally require a human assessment as to whether a person merits further attention. Specific applications include government agencies processing security clearance, internal affairs officers questioning witnesses, intelligence officers or military officers questioning immigrants or prisoners of war, or any other instance in which a search warrant would be obtainable, or in which a voice stress analyzer or other similar technique could be used without a warrant. The IR-CMS system is designed to facilitate real time assistance to an investigator in detecting stress in a person under formal or informal questioning. The use of IR imaging allows the process to be done under any lighting condition, including total darkness. The use of various feedback devices such as a vibrating "pager" or earphone allows the system to be tailored to a particular operational scenario. The use of quick-plant concealed deployed systems allows for longer range and longer unattended periods for those cases where the subject can be brought to a particular location.

Image sequences from high sensitivity infrared imaging sensors are analyzed in realtime to detect thermal variations in the face of a subject. Changes which occur in specific areas of the face and have the correct asymmetry indicate possible deception in response to questions asked by a human interviewer or by an automated system. Thermal changes of the same degree which occur in other areas of the face or which have different levels of asymmetry are indicative of possible physiological stress or medical conditions without deceptive intent. Analysis is automated and can be continually provided to the interviewer to guide his questioning, or can be used by an automated system to pre-screen and select subjects prior to interview.

Automated, interactive versions of the system display written questions on a monitor, including asking the subject to choose a language. The subject must push a button to answer each question. During the interaction, the system extracts identification information from the thermal image, and detects indicators of stress associated with any particular question or subject matter. The automated systems can be used to pre-screen subjects prior to meeting with an Interviewer. Certain subjects may not require interviews based upon the results of the automated screening. The number of Automated systems can be sized to accommodate passenger load and level of perceived risk.

Visual and infrared cameras are both used, as well as a scanner which reads travel documents. Collection of the visual and infrared facial images together with the travel documents provides the opportunity to confirm identity of the subject and the opportunity to calibrate his level of responses relative to his previous data which can be stored in an online database. The automated system can produce a color-coded card which directs the subject to either proceed to his next step (such as customs area), or divert to an interviewer. The effect of the resulting delay can be to enhance the detectability of deception by the interviewer support system, and to increase the effectiveness of the interviewer. Information is provided to the interviewer via the card, via hardwired communications, or via RF depending on the scenario of use. The combination of automated screening and interviewer-assisted screening offers the highest throughput capability, can reduce the need for language-skilled interviewers, and can best accommodate passengers in all modes of transportation.

Figure 15:
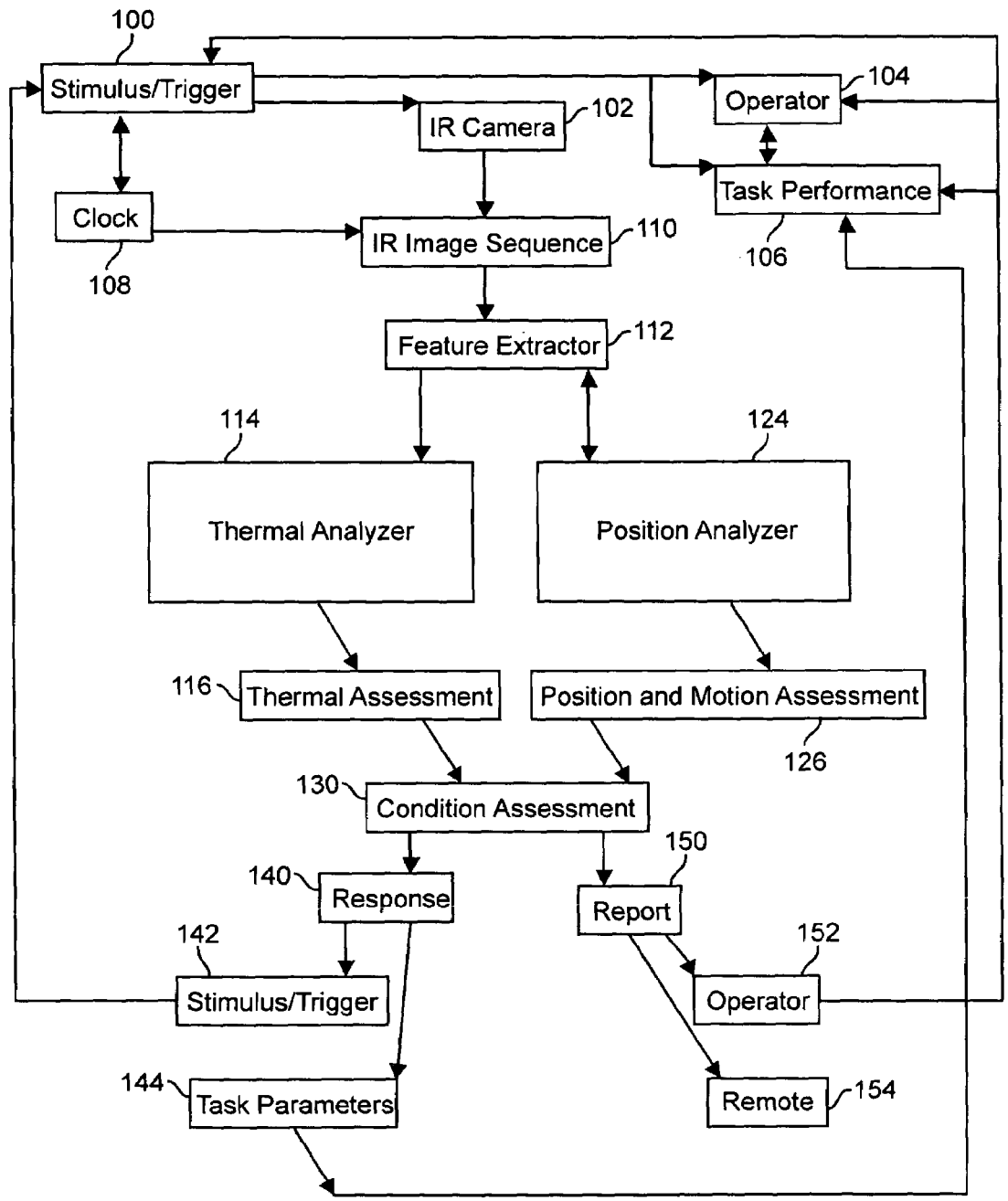
FIG. 15 shows the IR-CMS System Functional Diagram.

Now turning to FIG. 15 there is shown a functional diagram for operation of the invention. The system is started by a trigger or stimulus 100 which activates the IR camera 102 which is oriented such that operator 104 is within its field of view when the operator is performing task 106. A clock 108 may provide the trigger to the clock and/or to an image sequence generator such as a frame grabber 110. The sequence of images is input to a feature extractor 112 which outputs to thermal analyzer 114 and to position analyzer 124. The thermal analyzer 114 performs transforms on the temperature data and extracts patterns, values, and changes to the features over the sequence. Features may be anatomical references including areas of the face, vasculature and branch points, lymph nodes, pupils. Features may be in transform space rather than anatomical space; such as Fourier or Markov transforms. Assessment of the thermal analysis is performed at 116 through comparison with previous thermal variations seen in sequences from operators whose condition was known, including previous sequences with the same current operator.

The extracted features from 112 are also input to the position analyzer 124 which considers the movements of both the anatomical features and the transformed features. Movements of the head and face within the field of view, movements of the eyes relative to the head and relative to the field of view, movements of the eyelids and pupils, and movements of specific facial minutiae relative to the face are all considered and compared with previous motion variations seen from operators whose condition was known, including previous sequences with the same current operator. The assessment is output at 126 to the condition assessment module 130.

Condition assessment module 130 considers both thermal and motion assessments to determine the current operator's condition. If there is conflict between the assessment based upon thermal and that based upon movement analysis, this module applies a weighting or other standard decision approach to determining the composite assessment which produces response 140 which is designed to cause the desired result given the assessed condition. This result may be to activate another stimulus or trigger device 142 based upon the nature of the result, which would then effect stimulus/trigger 100. Or 142 and 100 could be the same. The result might be to speed up the camera rate or to zoom in the camera. Response 140 could also directly modify the parameters 144 of the task 106 being performed. The modification could be to speed up the equipment being used by the operator.

The output of the condition assessment module 130 also can provide feedback 150 to the operator himself at 152 and to remote sites at 154. The report to the operator can be in the form of realtime or recorded written or audio message or digital display. The remote reporting can be via RF link or other communications technique. The remote site 154 can modify the task parameters 144, and the stimulus/triggers 142 based upon the report 150.

Figure 16:
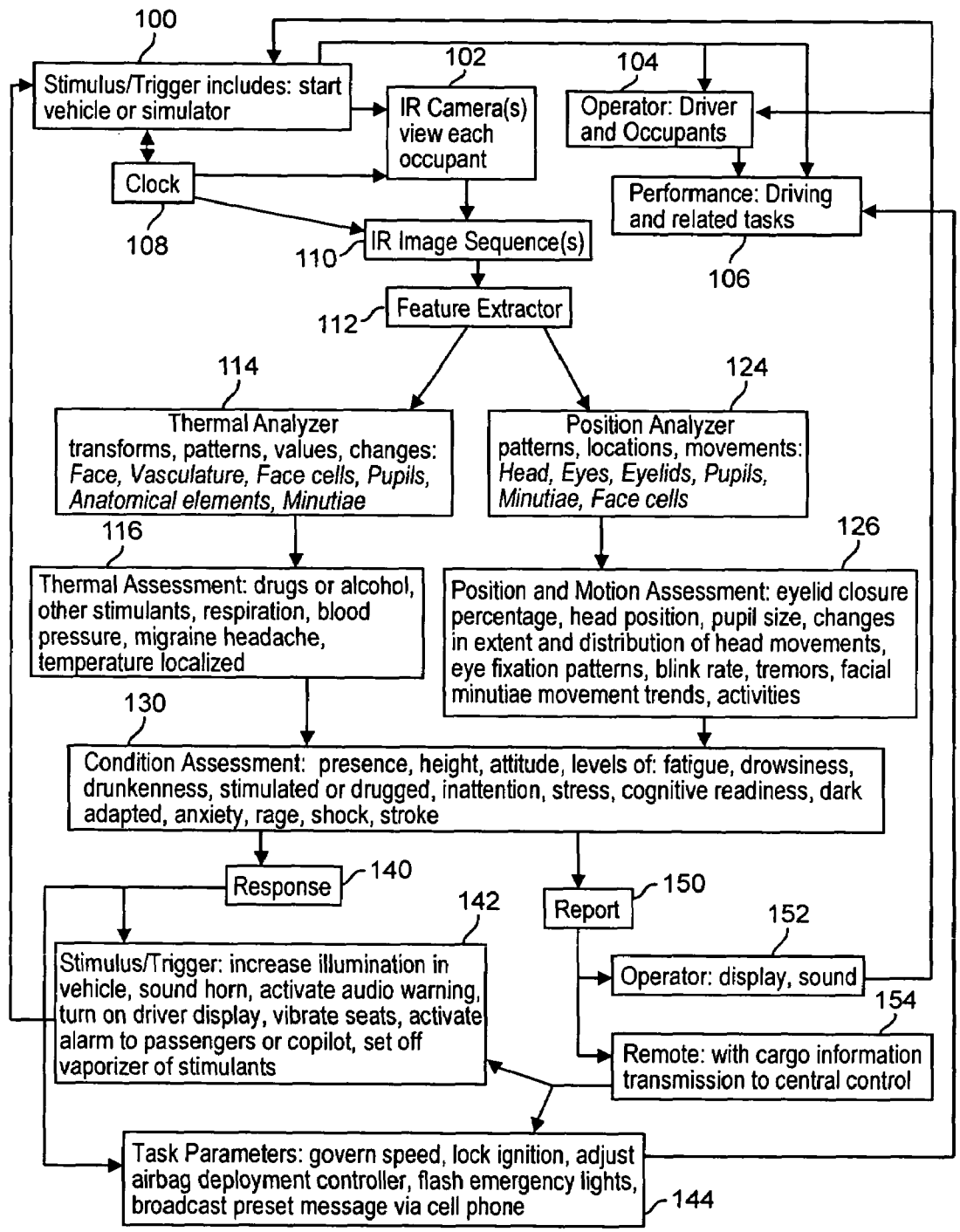
FIG. 16 illustrates the system used for the embodiment of driver monitoring in an actual vehicle or simulator.

The system shown in FIG. 15 may be implemented with respect to the vehicle operator monitoring embodiment described above, as shown in FIG. 16 to which we now turn. The trigger event 100 is turning on the vehicle or simulator. One or more IR cameras at 102 view the driver 104. Additional cameras may view occupants of the vehicle. The task 106 being monitored is driving and related tasks. The clock 108 is activated when the system is triggered 100 and produces image sequences 110 from the cameras. For each sequence, feature extractor 112 produces temperature and movement-related data from each frame for input to the thermal analyzer 114 and position analyzer 124. Monitoring can be continuous, however the sequence length is selected to provide updated condition information periodically.

Thermal analyzer 114 extracts patterns, values, and changes in temperature of the face, vasculature, face cells, pupils, minutiae and anatomical elements. It considers the values within each frame and frame-to-frame of the features, including: value, size, shape, and location of thermal contours; temperatures of specific anatomical locations such as the canthi and pulse points; components of transforms performed such as Fourier and Markov, and outputs the analysis results to the thermal assessment module 116 which determines thermal trends and also compares the analysis results to data previously obtained with the same or other drivers under known conditions. For example, it compares areas associated with specific conditions such as the chi pattern in the forehead corresponding to migraine headaches. The thermal assessment of condition is output to the condition assessment module at 130.

Position analyzer 124 considers the location of anatomical features such as the canthi, blood vessel branches, eyelids, pupils, head and eyes, nostrils, and other observable reference points such as moles, scars, scratches, or contact lenses. It also considers the patterns, locations and movements associated with minutiae and face cells. Derived location and motion data is output to the position and motion assessment module 126 which determines eyelid closure percentage, head position, pupil size, variations and trends in head and eye movement chronology, blink rate, tremors, facial minutiae as well as variations and trends in facial movements associated with stress, anxiety, speech, facial expressions, and activities such as drinking and checking dashboard instruments and sideview mirrors. The results of the motion analysis are output to the condition assessment module at 130.

Condition assessment 130 couples the thermal and motion assessments to remove those conditions for which conflicting evidence is presented from the two assessment modes. Remaining evidence can be compared to predetermined data to establish confidence levels in the composite assessment, and to relate current condition to standard scales with respect to attributes such as presence, height, attitude and levels of: attentiveness, fatigue, drowsiness, drunkenness, stress, cognitive readiness, dark adaptation, anxiety, and rage. Trends from sequence to sequence are also determined, as well as predictions for the onset of specific conditions which need to be avoided.

The assessment from 130 is conveyed 150 to the operator himself at 152 either in real time or later, through audible message, visual display or other means. It can also be remotely reported 154 along with vehicle and cargo information through the satellite terminal used by commercial and military trucks to report location and status of the vehicle and cargo.

The assessment from 130 is also conveyed to the response generator 140 which directs response stimulus or trigger actions 142 and makes changes to task parameters 144. Stimulus/trigger module 142 in this example can activate mechanisms to increase driver attentiveness, including generation of odors, seat vibration, increased illumination inside the vehicle, and pre-recorded audible messages. The IR camera 102 can be directed to increase its frame rate and to zoom in on a particular area of the driver, such as his forehead or eye area, to monitor predicted conditions more closely, such as focusing on eye blinks during deployment of odors and alarms to evaluate their effectiveness.

Task parameters 144 can limit the acceleration of the vehicle or cause it to decelerate with emergency lights and alarms activated if the driver is determined to be incapacitated. For a military vehicle, HazMat vehicle, armoured car, or other high value vehicle, the remote command center 154 can modify the task parameters 144, including taking over the driving control from a driver determined to be outside of allowable conditions, and can control the 142 stimulus/trigger to destroy sensitive instrumentation onboard.

Figure 17:
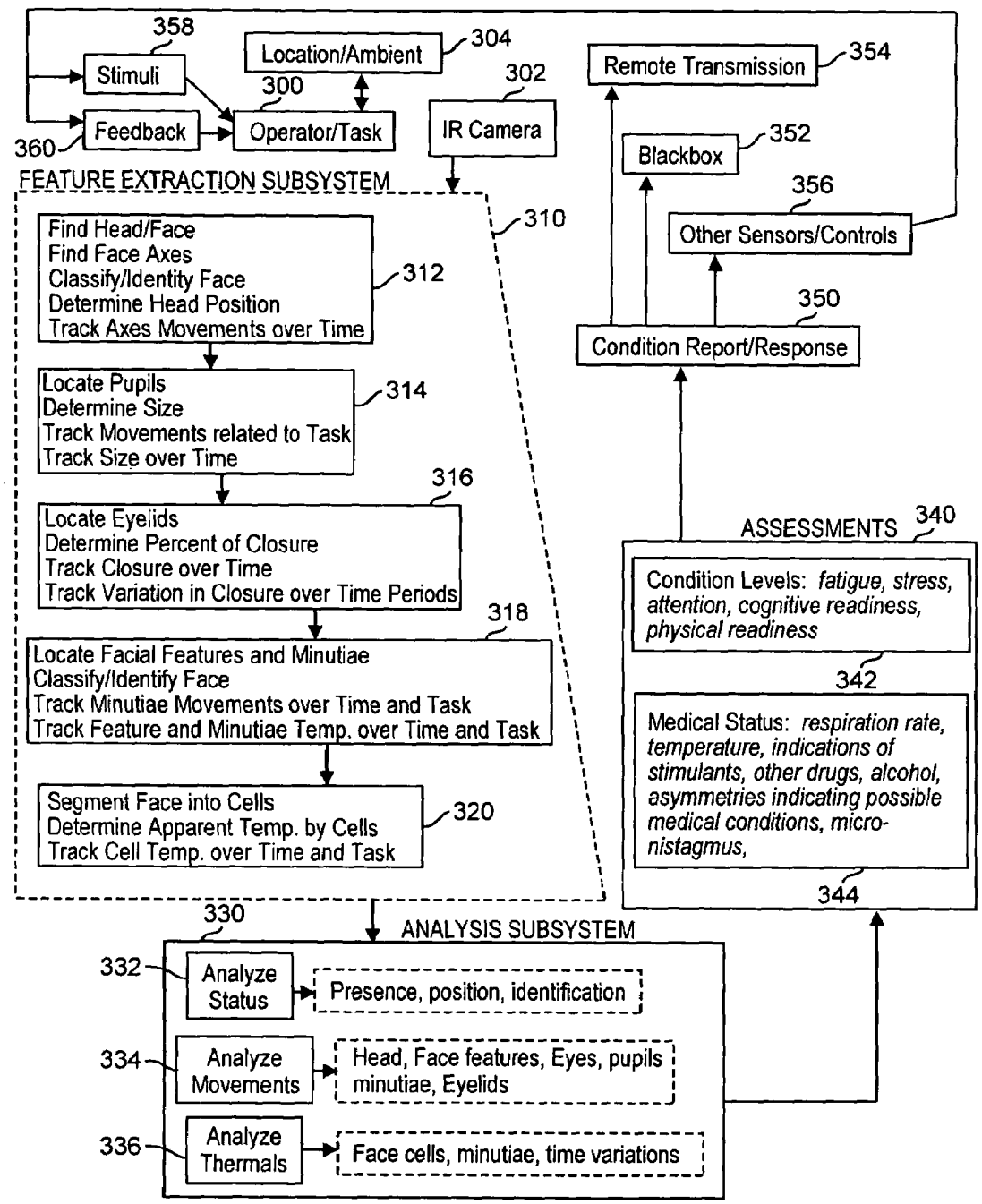
FIG. 17 is a diagram showing the information flow of the system.

A detailed description of IR-CMS information flow will now be described with reference to FIG. 17. An operator 300 performs a task and is monitored by infrared camera 302 within a location 304 with a particular ambient environment. Images from the IR camera 302 flow into the feature extraction subsystem 310. A module 312 extracts features related to head and face movement, including the head and face axes. A module 314 extracts features related to eye movements and pupil size. A module 316 extracts features related to eyelids and blinking. A module 318 extracts features related to thermal facial minutiae. A module 320 extracts features related to temperatures at points, on contours, and within cells of the face and head. Each module considers features within a frame as well as over a sequence.

The extracted features are input to the analysis subsystem 330. A module 332 analyzes to determine presence, position, and identification of the operator. A module 334 analyzes movements of the head, facial features, eyes, pupils, minutiae, and eyelids. A module 336 analyzes thermal features of the face cells, minutiae, and areas, including time variations of changes.

The results of analysis subsystem 330 are then used by the assessment subsystem 340 which determines condition levels 342 (fatigue, stress, attention, cognitive readiness, and physical readiness) and medical status 344 (respiration rate, temperature, indications of stimulants/drugs/alcohol, asymmetries indicating possible medical conditions, and micronistagmus). Consistent with what has been described in connection with FIG. 15, there are then generated condition report/response 350 which can then be stored in a blackbox 352, transmitted to a remote location 354 or used to trigger other sensors/controls 356 which can stimulate 358 or provide feedback 360 to the operator 300.

While the invention has been described in terms of preferred embodiments, those skilled in the art will recognize that the invention can be practiced with modification within the spirit and scope of the appended claims.

Having thus described my invention, what I claim as new and desire to secure by Letters Patent is as follows:

1. A system for monitoring and assessing the condition of human operators, comprising:
   an infrared camera, said camera providing passive thermal image sequences of the face of an operator;
   means for spatially orienting said face on each image by extracting a plurality of features from each image in said thermal image sequences with reference to a bilateral symmetry of the face with respect to each of said plurality of features said spatially oriented face being divided into a grid of cells, each said thermal image recording a temperature for each cell on said grid;
   means for analyzing said sequence of thermal images, said analysis being able to determine variation in spatial orientation of said face and variation in temperature of each cell in said grid and variation in temperature and position of said features on said face of said operator;
   means for using said analysis to assess a condition of said operator, said condition being defined with respect to performance of a task by said operator, said assessment having reference to data particular to said condition and task and being correlated with one or more of said variations determined by said analysis.

2. A system as in claim 1, further comprising a triggering means, said triggering means being used to operate said camera and to stimulate said operator, wherein said triggering means is optionally responsive to said condition assessment means.

3. A system as in claim 1, wherein said feature extracting means determines a position of head and face axes of the operator's face.

4. A system as in claim 3, wherein said feature extracting means determines a size and position of eye pupils of the operator.

5. A system as in claim 4, wherein said feature extracting means determines a percent of closure of eyelids of the operator.

6. A system as in claim 5, wherein said feature extracting means determines a position of facial minutiae of the operator.

7. A system as in claim 6, wherein said analysis identifies the operator by comparing facial minutiae of one of said infrared images with facial minutiae of a second of said infrared images.

8. A system as in claim 1, wherein said analyzing means determines the movement of the operator's head, facial minutiae, eyes, eyelids and pupils over time by comparing successive images in said image sequences.

9. A system as in claim 1, wherein said task is driving a vehicle and said condition is fatigue.

10. A system as in claim 1, wherein said task is operating an airport baggage screening device and said condition is cognitive readiness.

11. A system as in claim 1, wherein said task is air traffic control and said condition is attentiveness.

12. A system as in claim 2, further comprising means for reporting, said reporting means being responsive to said condition assessment.

13. A system as in claim 12, wherein said reporting means transmits said condition assessment in real-time to a remote location.

14. A system as in claim 12, wherein said reporting means records said condition assessment in real-time to a blackbox.

15. A system as in claim 12, wherein said reporting means provides feedback to the operator of said condition assessment.

16. A system as in claim 1, wherein said task is emergency response and said condition is stress.

17. A method for monitoring and assessing the condition of human operators, comprising the steps of:
   using an infrared camera to provide passive thermal image sequences of the face of an operator;
   spatially orienting said face on each image by extracting a plurality of features from each image in said thermal image sequences with reference to a bilateral symmetry of the face with respect to each of said plurality of features, said spatially oriented face being divided into a grid of cells, each said thermal image recording a temperature for each cell on said grid;
   analyzing said sequence of thermal images, said analysis being able to determine variation in spatial orientation of said face and variation in temperature of each cell in said grid and variation in temperature and position of said features on said face of said operator;
   using said analysis, to assess a condition of said operator, said condition being defined with respect to performance of a task by said operator.

18. The method of claim 17, further comprising the step of reporting said condition assessment.

19. The method of claim 17, wherein use of said analysis to assess a condition of said operator has reference to data particular to said condition and task and being correlated with one or more of said variations determined by said analysis.

20. The method of claim 17, wherein said cells in said grid are of such a size to discern minutiae, wherein movement of said minutiae in successive images in a thermal image sequence is analyzed to show facial micromovements.

21. The method of claim 20, wherein said facial micromovements are used to assess a condition of stress.

22. The method of claim 20, wherein said facial micromovements are combined with analysis of variation in temperature at one or more anatomical sites showing sweating and correlated with answers of the operator to questions and used to assess a condition of deception.

* * * * *